US011131917B2

(12) United States Patent
Nishikawa et al.

(10) Patent No.: US 11,131,917 B2
(45) Date of Patent: Sep. 28, 2021

(54) IMAGE DISPLAY APPARATUS, PROJECTION OPTICAL SYSTEM, AND IMAGE DISPLAY SYSTEM

(71) Applicant: SONY CORPORATION, Tokyo (JP)

(72) Inventors: Jun Nishikawa, Tokyo (JP); Naoko Edamitsu, Tokyo (JP); Tatsushi Nashida, Tokyo (JP); Yosuke Shimizu, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/978,472

(22) PCT Filed: Mar. 11, 2019

(86) PCT No.: PCT/JP2019/009702

§ 371 (c)(1),
(2) Date: Sep. 4, 2020

(87) PCT Pub. No.: WO2019/216017

PCT Pub. Date: Nov. 14, 2019

(65) Prior Publication Data

US 2021/0055645 A1 Feb. 25, 2021

(30) Foreign Application Priority Data

May 10, 2018 (JP) ............................ JP2018-091549

(51) Int. Cl.
*G03B 21/28* (2006.01)
*G02B 17/08* (2006.01)
(Continued)

(52) U.S. Cl.
CPC ......... *G03B 21/28* (2013.01); *G02B 17/0816* (2013.01); *G03B 21/2066* (2013.01); *G03B 21/56* (2013.01)

(58) Field of Classification Search
CPC .... G03B 21/28; G03B 21/56; G03B 21/2066; G02B 17/0816
(Continued)

(56) References Cited

U.S. PATENT DOCUMENTS

| | | | | |
|---|---|---|---|---|
| 8,210,693 B2 * | 7/2012 | Nishikawa | G03B 21/28 353/99 |
| 9,372,388 B2 * | 6/2016 | Matsuo | G02B 17/08 |

(Continued)

FOREIGN PATENT DOCUMENTS

| | | |
|---|---|---|
| EP | 1 806 612 A1 | 7/2007 |
| JP | 2010-175844 A | 8/2010 |

(Continued)

OTHER PUBLICATIONS

International Search Report dated Apr. 16, 2019 in PCT/JP2019/009702 filed on Mar. 11, 2019, 2 pages.

*Primary Examiner* — William C. Dowling
(74) *Attorney, Agent, or Firm* — Oblon, McClelland, Maier & Neustadt, L.L.P.

(57) ABSTRACT

An image display apparatus according to an aspect of the present technology includes a light source, an image generator, and a projection optical system. The image generator modulates light emitted from the light source and generates image light. The projection optical system includes a lens system and a concave reflective surface. The lens system is configured on a basis of a reference axis at a position on which the generated image light is incident, and has a positive refracting power as a whole. The concave reflective surface is configured on a basis of the reference axis, and reflects the image light emitted from the lens system toward a projection target. In addition, the concave reflective surface reflects at least one or more light beams included in the image light incident on the concave reflective surface,
(Continued)

toward a direction that intersects with a direction along the reference axis at an angle of 80 degrees or more.

19 Claims, 25 Drawing Sheets

(51) Int. Cl.
*G03B 21/56* (2006.01)
*G03B 21/20* (2006.01)

(58) Field of Classification Search
USPC ...................................................... 353/98, 99
See application file for complete search history.

(56) References Cited

U.S. PATENT DOCUMENTS

| | | | | |
|---|---|---|---|---|
| 10,534,252 | B2 * | 1/2020 | Minefuji | G02B 13/16 |
| 2008/0158439 | A1 | 7/2008 | Nishikawa | |
| 2011/0199659 | A1 * | 8/2011 | Yasuda | G02B 5/32 359/3 |
| 2012/0120484 | A1 * | 5/2012 | Konuma | G02B 17/0896 359/364 |
| 2016/0216497 | A1 * | 7/2016 | Minefuji | G02B 15/1421 |
| 2017/0332057 | A1 | 11/2017 | Matsuo | |

FOREIGN PATENT DOCUMENTS

| | | | |
|---|---|---|---|
| JP | 5365155 | B2 | 12/2013 |
| JP | 2015-87487 | A | 5/2015 |
| JP | 2016-4227 | A | 1/2016 |
| WO | WO 2016/068269 | A1 | 5/2016 |

* cited by examiner

| | |
|---|---|
| NA | 0.127 |
| Image modulation element (HxVSp) | 8.2 x 4.6 |
| Center position of image modulation element (Chp) | 3.7 |
| Image circle on primary image surface side (imc) | 14.6 |

| | | | | Curvature radius | thickness | nd | νd |
|---|---|---|---|---|---|---|---|
| | | P | | ∞ | 2.1 | 1.458 | 68 |
| | | 1 | | ∞ | 8.6 | 1.805 | 25 |
| | | 2 | | ∞ | 4.1 | | |
| | | 3 | | 19.3 | 3.8 | 1.808 | 23 |
| | | 4 | | 0.0 | 1.1 | | |
| | | 5 | | 12.7 | 7.6 | 1.593 | 67 |
| | | 6 | | -10.8 | 0.8 | 1.699 | 30 |
| | | 7 | | 7.1 | 2.5 | | |
| | | 8 | | 18.2 | 2.9 | 1.593 | 67 |
| | | 9 | | -9.6 | 8.6 | | |
| L1 | | 10 | | 12.3 | 3.5 | 1.593 | 67 |
| | | 11 | | -139.5 | 10.8 | | |
| | | 12 | * | 0.73 | 2.8 | 1.525 | 56 |
| | | 13 | * | 0.24 | 35.0 | | |
| | Mr1 | 14 | | -24.6 | -31.2 | refl | |
| | Mr2 | 15 | * | -21.4 | 31.2 | refl | |
| | | 16 | | -24.6 | 1.9 | 1.805 | 25 |
| | | 17 | | -44.7 | 1.9 | | |
| | | 18 | | -27.1 | 1.5 | 1.808 | 23 |
| | | 19 | | -20.3 | 0.8 | | |
| | | 20 | | 18.8 | 0.8 | 1.904 | 31 |
| | | 21 | | 13.2 | 1.4 | | |
| | | 22 | | 16.3 | 3.6 | 1.593 | 67 |
| | | 23 | | -355.0 | 19.0 | | |
| L2 | Mr3 | 24 | * | -3.6 | -650.0 | refl | |
| | | S | $ | 650.0 | | | |

* ··· Aspherical surface
$ ··· Decenter and tilt surface

| | | | | | |
|---|---|---|---|---|---|
| K: | -1.48E+00 | A2: | -1.01E+00 | A3: | 2.90E-01 |
| A4: | -3.93E-02 | A5: | -2.74E-04 | A6: | 6.95E-04 |
| A7: | 1.02E-05 | A8: | -2.38E-05 | A9: | 1.64E-06 |
| A10: | 3.55E-07 | A11: | -5.93E-08 | A12: | 2.58E-09 |

S13

| | | | | | |
|---|---|---|---|---|---|
| K: | -1.04E+00 | A2: | -2.27E+00 | A3: | 6.20E-01 |
| A4: | -1.10E-01 | A5: | 9.72E-03 | A6: | 9.19E-05 |
| A7: | -7.22E-05 | A8: | -3.65E-06 | A9: | 1.00E-06 |
| A10: | 7.64E-08 | A11: | -1.98E-08 | A12: | 8.94E-10 |

S15

| | | | | | |
|---|---|---|---|---|---|
| K: | -1.87E-01 | A2: | 4.56E-02 | A3: | 8.92E-04 |
| A4: | -1.42E-04 | A5: | 1.17E-05 | A6: | -1.49E-07 |
| A7: | -3.27E-08 | A8: | 1.76E-09 | A10: | -1.52E-12 |
| A12: | 9.30E-16 | | | | |

S24

| | | | | | |
|---|---|---|---|---|---|
| K: | -9.64E-01 | A2: | 1.08E-01 | A3: | 4.10E-03 |
| A4: | -1.31E-04 | A5: | -1.97E-05 | A6: | -5.30E-07 |
| A7: | 4.72E-07 | A8: | -3.02E-08 | A10: | 4.19E-11 |
| A12: | -3.43E-14 | | | | |

S

| | | | | | |
|---|---|---|---|---|---|
| XDE: | 0 | YDE: | 500 | ZDE: | -200 |
| ADE: | -3 | BDE: | 0 | CDE: | 0 |

FIG.10

| | height | shape | thita | Δθ |
|---|---|---|---|---|
| 0.00 | 0.0 | 0.0 | 0.0 | |
| 0.02 | 0.3 | -0.0 | -1.8 | -1.81 |
| 0.04 | 0.6 | -0.0 | -3.3 | -1.53 |
| 0.06 | 1.0 | -0.0 | -4.6 | -1.28 |
| 0.08 | 1.3 | -0.1 | -5.7 | -1.05 |
| 0.10 | 1.6 | -0.1 | -6.5 | -0.85 |
| 0.12 | 1.9 | -0.1 | -7.2 | -0.68 |
| 0.14 | 2.2 | -0.2 | -7.7 | -0.55 |
| 0.16 | 2.5 | -0.2 | -8.2 | -0.43 |
| 0.18 | 2.9 | -0.3 | -8.5 | -0.35 |
| 0.20 | 3.2 | -0.3 | -8.8 | -0.29 |
| 0.22 | 3.5 | -0.4 | -9.1 | -0.26 |
| 0.24 | 3.8 | -0.4 | -9.3 | -0.25 |
| 0.26 | 4.1 | -0.5 | -9.6 | -0.26 |
| 0.28 | 4.5 | -0.5 | -9.9 | -0.29 |
| 0.30 | 4.8 | -0.6 | -10.2 | -0.34 |
| 0.32 | 5.1 | -0.6 | -10.6 | -0.40 |
| 0.34 | 5.4 | -0.7 | -11.1 | -0.47 |
| 0.36 | 5.7 | -0.8 | -11.6 | -0.54 |
| 0.38 | 6.0 | -0.8 | -12.3 | -0.62 |
| 0.40 | 6.4 | -0.9 | -13.0 | -0.71 |
| 0.42 | 6.7 | -1.0 | -13.8 | -0.79 |
| 0.44 | 7.0 | -1.1 | -14.6 | -0.87 |
| 0.46 | 7.3 | -1.2 | -15.6 | -0.94 |
| 0.48 | 7.6 | -1.2 | -16.6 | -1.01 |
| 0.50 | 8.0 | -1.3 | -17.6 | -1.07 |
| 0.52 | 8.3 | -1.4 | -18.8 | -1.12 |
| 0.54 | 8.6 | -1.6 | -19.9 | -1.17 |
| 0.56 | 8.9 | -1.7 | -21.1 | -1.21 |
| 0.58 | 9.2 | -1.8 | -22.4 | -1.24 |
| 0.60 | 9.5 | -1.9 | -23.6 | -1.26 |
| 0.62 | 9.9 | -2.1 | -24.9 | -1.29 |
| 0.64 | 10.2 | -2.2 | -26.2 | -1.30 |
| 0.66 | 10.5 | -2.4 | -27.5 | -1.32 |
| 0.68 | 10.8 | -2.6 | -28.9 | -1.33 |
| 0.70 | 11.1 | -2.7 | -30.2 | -1.35 |
| 0.72 | 11.4 | -2.9 | -31.6 | -1.36 |
| 0.74 | 11.8 | -3.1 | -33.0 | -1.38 |
| 0.76 | 12.1 | -3.4 | -34.4 | -1.40 |
| 0.78 | 12.4 | -3.6 | -35.8 | -1.42 |
| 0.80 | 12.7 | -3.8 | -37.2 | -1.44 |
| 0.82 | 13.0 | -4.1 | -38.7 | -1.47 |
| 0.84 | 13.4 | -4.3 | -40.2 | -1.51 |
| 0.86 | 13.7 | -4.6 | -41.8 | -1.57 |
| 0.88 | 14.0 | -4.9 | -43.4 | -1.64 |
| 0.90 | 14.3 | -5.2 | -45.1 | -1.73 |
| 0.92 | 14.6 | -5.5 | -47.0 | -1.87 |
| 0.94 | 14.9 | -5.9 | -49.1 | -2.05 |
| 0.96 | 15.3 | -6.3 | -51.3 | -2.29 |
| 0.98 | 15.6 | -6.7 | -53.9 | -2.59 |
| 1.00 | 15.9 | -7.1 | -56.9 | -2.96 |

FIG.11

| | |
|---|---|
| \| Z'(1.0·hmax) - Z'(0.9·hmax) \| | 11.8 |
| \| Z'(ave.) \| | 5.7 |
| \| Z'(1.0·hmax) - Z'(0.9·hmax) \| / \| Z'(ave.) \| | 2.07 |
| Length of optical path of C1 | 1031.11 |
| Length of optical path of C2=Lp1=Ln | 634.76 |
| Length of optical path of C3=Lp2=Lf | 1311.61 |
| Length of optical path of C4 | 1236.61 |
| Lp1/Lp2 | 0.48 |
| Ln/Lf | 0.48 |

FIG.14

| | |
|---|---|
| NA | 0.127 |
| Image modulation element (HxVSp) | 8.2 x 4.6 |
| Center position of image modulation element (Chp) | 2.9 |
| Image circle on primary image surface side (imc) | 13.2 |

| | | | | Curvature radius | thickness | nd | νd |
|---|---|---|---|---|---|---|---|
| | | P | | ∞ | 2.1 | 1.458 | 68 |
| | | 1 | | ∞ | 8.6 | 1.805 | 25 |
| | | 2 | | ∞ | 4.1 | | |
| L1 | | 3 | | 14.5 | 2.7 | 1.808 | 23 |
| L1 | | 4 | | 27.5 | 1.0 | | |
| L1 | | 5 | | 10.9 | 8.9 | 1.593 | 67 |
| L1 | | 6 | | -11.3 | 0.8 | 1.689 | 31 |
| L1 | | 7 | | 6.9 | 2.6 | | |
| L1 | | 8 | | 18.1 | 2.1 | 1.593 | 67 |
| L1 | | 9 | | -9.9 | 10.1 | | |
| L1 | | 10 | | 9.9 | 3.6 | 1.593 | 67 |
| L1 | | 11 | | 34.1 | 13.5 | | |
| L1 | | 12 | * | 0.75 | 2.8 | 1.525 | 56 |
| L1 | | 13 | * | 0.26 | 36.2 | | |
| L1 | Mr1 | 14 | | -27.0 | -34.0 | refl | |
| L1 | Mr2 | 15 | * | -22.0 | 34.0 | refl | |
| L1 | | 16 | | -27.0 | 1.9 | 1.805 | 25 |
| L1 | | 17 | | -97.8 | 1.0 | | |
| L1 | | 18 | | 102.7 | 1.5 | 1.808 | 23 |
| L1 | | 19 | | -53.7 | 1.0 | | |
| L1 | | 20 | | 19.9 | 0.8 | 1.904 | 31 |
| L1 | | 21 | | 12.8 | 1.2 | | |
| L1 | | 22 | | 15.9 | 3.6 | 1.593 | 67 |
| L1 | | 23 | | 147.2 | 60.4 | | |
| L2 | Mr3 | 24 | * | -41.1 | -85.0 | refl | |
| | | S | $ | 650.0 | | | |

* ··· Aspherical surface $ ··· Decenter and tilt surface

| | | | | | |
|---|---|---|---|---|---|
| K: | -1.75E+00 | A2: | -8.93E-01 | A3: | 2.63E-01 |
| A4: | -3.73E-02 | A5: | -8.25E-05 | A6: | 6.89E-04 |
| A7: | 6.99E-06 | A8: | -2.42E-05 | A9: | 1.64E-06 |
| A10: | 3.66E-07 | A11: | -5.82E-08 | A12: | 2.40E-09 |

S13

| | | | | | |
|---|---|---|---|---|---|
| K: | -1.04E+00 | A2: | -2.05E+00 | A3: | 5.57E-01 |
| A4: | -1.03E-01 | A5: | 9.81E-03 | A6: | 7.41E-05 |
| A7: | -7.62E-05 | A8: | -3.82E-06 | A9: | 1.02E-06 |
| A10: | 8.19E-08 | A11: | -1.94E-08 | A12: | 8.25E-10 |

S15

| | | | | | |
|---|---|---|---|---|---|
| K: | -1.56E-01 | A2: | 4.44E-02 | A3: | 8.44E-04 |
| A4: | -1.42E-04 | A5: | 1.20E-05 | A6: | -1.47E-07 |
| A7: | -3.34E-08 | A8: | 1.73E-09 | A10: | -1.36E-12 |
| A12: | 7.83E-16 | | | | |

S24

| | | | | | |
|---|---|---|---|---|---|
| K: | 3.64E+00 | A2: | -7.15E-02 | A3: | 5.64E-03 |
| A4: | -5.51E-05 | A5: | -3.50E-05 | A6: | -1.10E-06 |
| A7: | 4.94E-07 | A8: | -2.57E-08 | A10: | 2.35E-11 |
| A12: | -1.34E-14 | | | | |

S Example 2-1

| | | | | | |
|---|---|---|---|---|---|
| XDE: | 0 | YDE: | 300 | ZDE: | 0 |
| ADE: | -9 | BDE: | 0 | CDE: | 0 |

S Example 2-2

| | | | | | |
|---|---|---|---|---|---|
| XDE: | 0 | YDE: | 300 | ZDE: | 0 |
| ADE: | 0 | BDE: | 0 | CDE: | 0 |

FIG.21

| | height | shape | thita | Δθ |
|---|---|---|---|---|
| 0.00 | 0.0 | 0.0 | 0.0 | |
| 0.02 | 0.4 | -0.0 | -3.5 | -3.45 |
| 0.04 | 0.8 | -0.0 | -6.6 | -3.16 |
| 0.06 | 1.1 | -0.1 | -9.5 | -2.87 |
| 0.08 | 1.5 | -0.2 | -12.1 | -2.60 |
| 0.10 | 1.9 | -0.3 | -14.4 | -2.34 |
| 0.12 | 2.3 | -0.4 | -16.5 | -2.12 |
| 0.14 | 2.7 | -0.5 | -18.5 | -1.93 |
| 0.16 | 3.0 | -0.6 | -20.2 | -1.77 |
| 0.18 | 3.4 | -0.8 | -21.9 | -1.64 |
| 0.20 | 3.8 | -0.9 | -23.4 | -1.54 |
| 0.22 | 4.2 | -1.1 | -24.9 | -1.47 |
| 0.24 | 4.6 | -1.3 | -26.3 | -1.42 |
| 0.26 | 4.9 | -1.5 | -27.7 | -1.40 |
| 0.28 | 5.3 | -1.7 | -29.1 | -1.39 |
| 0.30 | 5.7 | -1.9 | -30.5 | -1.38 |
| 0.32 | 6.1 | -2.1 | -31.9 | -1.39 |
| 0.34 | 6.5 | -2.4 | -33.3 | -1.39 |
| 0.36 | 6.8 | -2.6 | -34.7 | -1.40 |
| 0.38 | 7.2 | -2.9 | -36.1 | -1.40 |
| 0.40 | 7.6 | -3.2 | -37.5 | -1.39 |
| 0.42 | 8.0 | -3.5 | -38.8 | -1.38 |
| 0.44 | 8.4 | -3.8 | -40.2 | -1.36 |
| 0.46 | 8.7 | -4.1 | -41.5 | -1.33 |
| 0.48 | 9.1 | -4.5 | -42.8 | -1.30 |
| 0.50 | 9.5 | -4.8 | -44.1 | -1.25 |
| 0.52 | 9.9 | -5.2 | -45.3 | -1.21 |
| 0.54 | 10.3 | -5.6 | -46.4 | -1.16 |
| 0.56 | 10.6 | -6.0 | -47.6 | -1.12 |
| 0.58 | 11.0 | -6.4 | -48.6 | -1.07 |
| 0.60 | 11.4 | -6.9 | -49.7 | -1.03 |
| 0.62 | 11.8 | -7.3 | -50.7 | -1.00 |
| 0.64 | 12.2 | -7.8 | -51.6 | -0.97 |
| 0.66 | 12.5 | -8.3 | -52.6 | -0.94 |
| 0.68 | 12.9 | -8.8 | -53.5 | -0.93 |
| 0.70 | 13.3 | -9.3 | -54.4 | -0.92 |
| 0.72 | 13.7 | -9.8 | -55.4 | -0.92 |
| 0.74 | 14.1 | -10.4 | -56.3 | -0.92 |
| 0.76 | 14.4 | -11.0 | -57.2 | -0.93 |
| 0.78 | 14.8 | -11.6 | -58.2 | -0.95 |
| 0.80 | 15.2 | -12.2 | -59.1 | -0.97 |
| 0.82 | 15.6 | -12.9 | -60.1 | -1.00 |
| 0.84 | 16.0 | -13.5 | -61.1 | -1.03 |
| 0.86 | 16.3 | -14.2 | -62.2 | -1.08 |
| 0.88 | 16.7 | -15.0 | -63.4 | -1.15 |
| 0.90 | 17.1 | -15.8 | -64.6 | -1.25 |
| 0.92 | 17.5 | -16.6 | -66.0 | -1.41 |
| 0.94 | 17.9 | -17.5 | -67.7 | -1.66 |
| 0.96 | 18.2 | -18.4 | -69.8 | -2.09 |
| 0.98 | 18.6 | -19.6 | -72.8 | -2.96 |
| 1.00 | 19.0 | -21.0 | -78.4 | -5.63 |

FIG.22

| | |
|---|---|
| \| Z'(1.0·hmax) - Z'(0.9·hmax) \| | 13.7 |
| \| Z'(ave.) \| | 7.8 |
| \| Z'(1.0·hmax) - Z'(0.9·hmax) \| / \| Z'(ave.) \| | 1.75 |
| Example 2-1 | |
| Length of optical path of C1 | 933.01 |
| Length of optical path of C2 = Lp1 = Ln | 418.12 |
| Length of optical path of C3 = Lp2 | 1195.5 |
| Length of optical path of C4 = Lf | 1277.93 |
| Lp1/Lp2 | 0.35 |
| Ln/Lf | 0.33 |
| Example 2-2 | |
| Length of optical path of C1 | 1045.3 |
| Length of optical path of C2 = Lp1 = Ln | 306.5 |
| Length of optical path of C3 = Lp2 | 1319.84 |
| Length of optical path of C4 = Lf | 1329.16 |
| Lp1/Lp2 | 0.23 |
| Ln/Lf | 0.23 |

FIG.25

IMAGE DISPLAY APPARATUS, PROJECTION OPTICAL SYSTEM, AND IMAGE DISPLAY SYSTEM

TECHNICAL FIELD

The present technology relates to an image display apparatus such as a projector, and to a projection optical system, for example.

BACKGROUND ART

In the past, a projector has been widely known as a projection type image display apparatus that displays a projection image on a screen. Recently, there is a growing demand for a front projection type projector having an ultra-wide angle, which is capable of displaying a large screen even in the case where the projection space is small. By using this projector, it is possible to project a larger screen also in a limited space by projecting it obliquely and at a wide angle on a screen.

By using the projection type projector having an ultra-wide angle described in Patent Literature 1, a screen shift for moving the projection image to be projected on the screen can be performed by moving at least one optical components included in the projection optical system. By using this screen shift, fine adjustment of the image position and the like can be easily performed (paragraphs [0023] and [0024] of the specification of Patent Literature 1).

CITATION LIST

Patent Literature

Patent Literature 1: JP 5365155B

DISCLOSURE OF INVENTION

Technical Problem

It is expected that a super-wide-angle projector will continue to be widely used, and thus there is a need for a technology for displaying images with high quality.

In view of the circumstances described above, it is an object of the present technology to provide an image display device, a projection optical system, and an image display system that make it possible to deal with a super-wide-angle projection and to display images with high quality.

Solution to Problem

To achieve the above-described purpose, an image display apparatus according to an aspect of the present technology includes a light source, an image generator, and a projection optical system.

The image generator modulates light emitted from the light source and generates image light.

The projection optical system includes a lens system and a concave reflective surface.

The lens system is configured on the basis of a reference axis at a position on which the generated image light is incident, and has a positive refracting power as a whole.

The concave reflective surface is configured on the basis of the reference axis, and reflects the image light emitted from the lens system toward a projection target. In addition, the concave reflective surface reflects at least one or more light beams included in the image light incident on the concave reflective surface, toward a direction that intersects with a direction along the reference axis at an angle of 80 degrees or more.

The image display apparatus uses the concave reflective surface to reflect at least one or more light beams included in the image light, toward the direction that intersects with the direction along the reference axis at the angle of 80 degrees or more. The reference axis serves as a criterion for configuring the projection optical system. This makes it possible to deal with projection of an image on, for example, a curved screen or the like, and display images with high quality.

The image light may include a plurality of pixel light beams. In this case, the concave reflective surface may reflect at least one of the plurality of pixel light beams toward the direction that intersects with the direction along the reference axis at the angle of 80 degrees or more.

The image display apparatus may be configured to satisfy a relationship:

$$80\text{ degrees} \le \theta 1\ \max \le 160\text{ degrees},$$

where θ1 represents an angle of intersection between the direction along the reference axis and propagation directions of respective light beams included in the image light reflected by the concave reflective surface, and θ1 max represents an angle θ1 of a light beam having a maximum angle θ1.

The concave reflective surface may be configured to have an axis of rotational symmetry that coincides with the reference axis. In this case, the image display apparatus is configured to satisfy a relationship:

$$1 \le |Z'(1.0 \cdot h\ \max) - Z'(0.9 \cdot h\ \max)| / |Z'ave.| < 20,$$

where h represents a height of the light beam above the reference axis, Z'(h) represents a derivative function obtained by differentiating a function Z(h) with respect to the height of the light beam, the function Z(h) represents a shape of the concave reflective surface corresponding to the height of the light beam, hmax represents a height of a light beam corresponding to a reflection point situated farthest from the reference axis for reflecting the image light, and Z'ave. represents an average value of the Z'(h) from the reference axis to the height hmax of the light beam.

The reference axis may be an axis obtained by extending an optical axis of a lens that is included in the lens system and that is situated closest to the image generator.

The lens system may be configured to include one or more optical components having respective optical axes that coincide with the reference axis.

The concave reflective surface may be configured to have an optical axis that coincides with the reference axis.

The concave reflective surface may be a freeform surface that has no axis of rotational symmetry.

A projection optical system according to an aspect of the present technology projects image light generated by modulating light emitted from a light source. The projection optical system includes the lens system and the concave reflective surface.

An image display system according to an aspect of the present technology includes a projection target and one or more image display apparatus, each of which includes the light source, the image generator, and the projection optical system.

The image generator may include an image modulation element that emits the image light. In this case, the image modulation element may include a plurality of pixels, each of which emits a pixel light beam, and the image modulation element may emit the image light including a plurality of the pixel light beams emitted from the plurality of pixels.

In addition, the image display system may be configured to satisfy a relationship:

$$0.005<Lp1/Lp2<0.5,$$

where Lp1 represents a length of an optical path of a pixel light beam emitted to the projection target from a pixel that is situated closest to the reference axis in the image modulation element, and Lp2 represents a length of an optical path of a pixel light beam emitted to the projection target from a pixel that is situated farthest from the reference axis and that is positioned on a straight line connecting the pixel situated closest to the reference axis with a central pixel in the image modulation element.

The image display system may be configured to satisfy a relationship:

$$0.005<Ln/Lf<0.5,$$

where Ln represents a length of an optical path of a shortest light beam to the projection target, and Lf represents a length of an optical path of a longest light beam among the light beams included in the image light.

The projection target may be a curved screen. In this case, the one or more image display apparatuses may be installed in such a manner that the respective concave reflective surfaces are disposed at positions corresponding to a shape of the curved screen.

The one or more image display apparatuses may include a first image display apparatus that projects a first image on the curved screen and a second image display apparatus that projects a second image on the curved screen. In this case, the first image display apparatus and the second image display apparatus respectively project the first image and the second image in such a manner that the first image and the second image overlap each other.

The first image display apparatus and the second image display apparatus may respectively project the first image and the second image in such a manner that beams of image light that constitute a region other than a region where the first image and the second image overlap each other do not intersect with each other.

The image generator may generate the image light that constitutes a rectangular image. In this case, the first image display apparatus and the second image display apparatus may respectively project the first image and the second image in such a manner that the first image and the second image overlap each other along a long-side direction of the first image and the second image.

The image generator may generate the image light that constitutes a rectangular image. In this case, the first image display apparatus and the second image display apparatus may respectively project the first image and the second image in such a manner that the first image and the second image overlap each other along a short-side direction of the first image and the second image.

The projection target may be a screen having a dome shape.

The one or more image display apparatus may include three or more image display apparatuses.

Advantageous Effects of Invention

As described above, according to the present technology, it is possible to deal with the super-wide-angle projection and to display images with high quality. Note that the effects described here are not necessarily limited, and any effect that is desired to be described in the present disclosure may be exhibited.

BRIEF DESCRIPTION OF DRAWINGS

FIG. 9 illustrates lens data of the image display apparatus and data of a curved screen.

FIG. 10 is a table illustrating an example of aspheric coefficients of optical components included in the projection optical system.

FIG. 11 is a table illustrating Z(h) and Z'(h) corresponding to a height h of a light beam.

FIG. 14 is a table illustrating values of parameters used in conditional expressions (2) to (4).

FIG. 20 illustrates lens data of an image display apparatus and data of a curved screen.

FIG. 21 is a table illustrating an example of aspheric coefficients of optical components included in the projection optical system.

FIG. 22 is a table illustrating Z(h) and Z'(h) corresponding to a height h of a light beam.

FIG. 25 is a table illustrating values of parameters used in conditional expressions (2) to (4).

MODE(S) FOR CARRYING OUT THE INVENTION

Hereinafter, embodiments of the present technology will be described with reference to the drawings.

[Outline of Projection Type Image Display Apparatus]

The outline of a projection type image display apparatus will be simply described using a liquid crystal projector as an example. The liquid crystal projector forms an optical image (image light) according to a video signal by spatially modulating light emitted from a light source. For the light modulation, a liquid crystal display element or the like serving as an image modulation element is used. For example, a three-chip liquid crystal projector including panel-like liquid crystal display elements (liquid crystal panels) respectively corresponding to R, G, and B is used.

The optical image is enlarged and projected by a projection optical system, and displayed on a screen. Here, description will be made assuming that the projection optical system supports an ultra-wide angle, e.g., a half angle of view being close to 70°. It goes without saying that the half angle of view is not limited thereto.

The liquid crystal projector that supports an ultra-wide angle is capable of displaying a large screen even in a small projection space. That is, even in the case where the distance between the liquid crystal projector and the screen is short, it is possible to perform enlarged projection. Accordingly, the following advantages are achieved.

It is possible to sufficiently suppress the possibility that light from the liquid crystal projector directly enters the human eyes, and achieve high safety, because the liquid crystal projector can be placed close to the screen.

Efficient presentation can be achieved, because shadows of humans or the like do not appear on the screen.

The degree of freedom of choice of installation location is high, and it can be easily installed also in a small installation space, a ceiling with many obstacles, or the like.

By installing it on a wall and using it, it is possible to easily perform maintenance such as cable routing as compared with the case where it is installed on a ceiling.

It is possible to increase the degree of freedom of setting for a meeting space, a classroom, a conference room, and the like.

Figure 1:
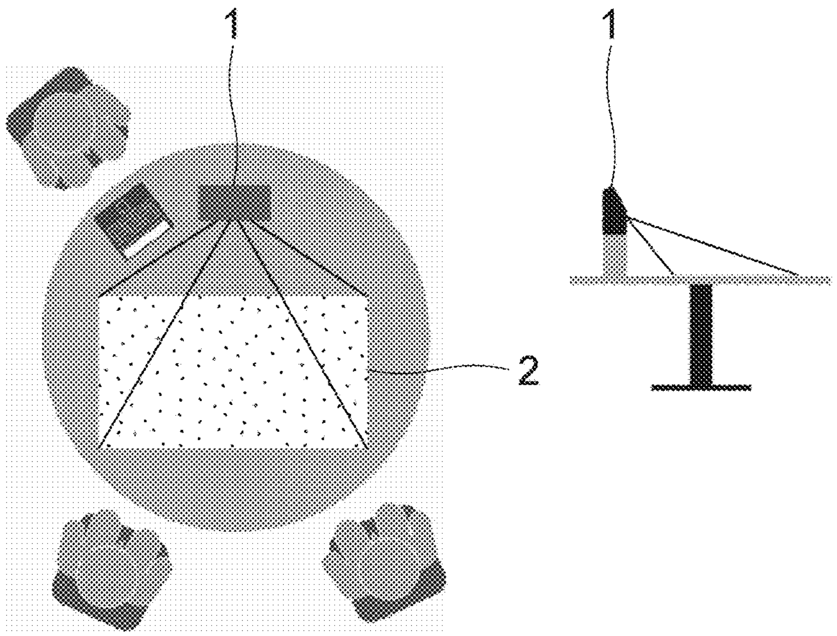
FIG. 1 is a schematic diagram for describing other advantages of a liquid crystal projector that supports an ultra-wide angle.

FIG. 1 is a schematic diagram for describing other advantages of the liquid crystal projector that supports an ultra-wide angle. As illustrated in FIG. 1, by installing a liquid crystal projector 1 that supports an ultra-wide angle above a table, an enlarged image 2 can be projected on the same table. It can also be used in such a way, and it is possible to efficiently use the space.

Recently, there is a growing demand for the liquid crystal projector that supports an ultra-wide angle with the widespread use of interactive whiteboards or the like in school, workplace, and the like. Further, a similar liquid crystal projector is used also in the field of digital signage (electronic advertisement) and the like. Note that as the interactive whiteboard, technologies relating to liquid-crystal displays (LCDs), plasma display panels (PDPs), and the like can also be used, for example. As compared with these, it is possible to reduce the cost and provide a large screen by using the liquid crystal projector that supports an ultra-wide angle. Note that the liquid crystal projector that supports an ultra-wide angle is also called a short focus projector, an ultra-short focus projector, or the like.

Figure 2:
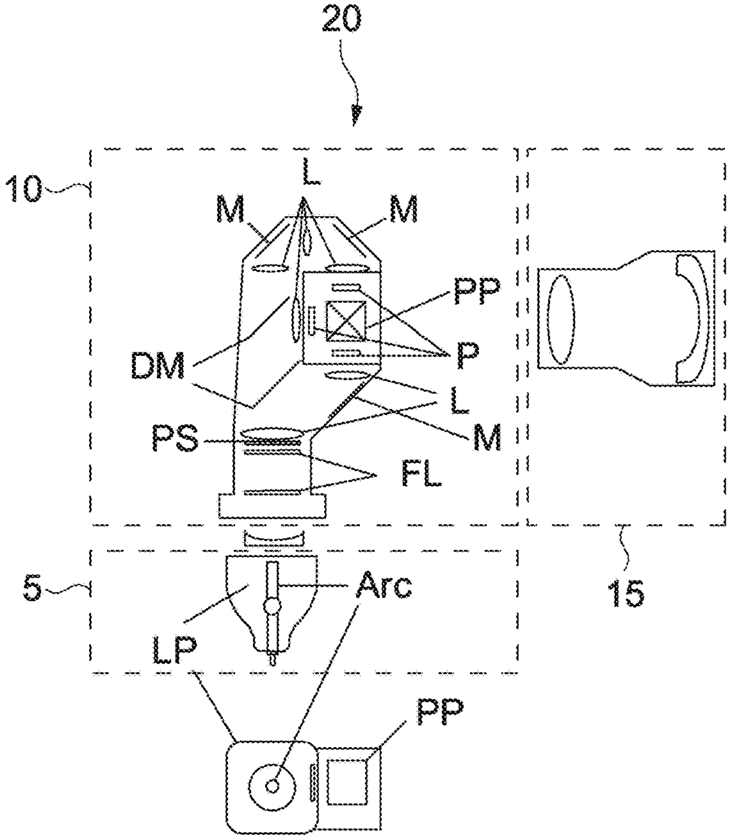
FIG. 2 is a schematic diagram illustrating a configuration example of a projection type image display apparatus.

FIG. 2 is a schematic diagram illustrating a configuration example of a projection type image display apparatus. An image display apparatus 20 includes a light source 5, an illumination optical system 10, and a projection optical system 15.

The light source 5 is placed so as to emit light flux to the illumination optical system 10. As the light source 5, for example, a high pressure mercury lamp or the like is used. Alternatively, a solid light source such as a light-emitting diode (LED) or a laser diode (LD) may be used.

The illumination optical system 10 uniformly delivers the light flux emitted from the light source 5 to a surface of an image modulation element (liquid crystal panel P) serving as a primary image surface. In the illumination optical system 10, the light flux from the light source 5 passes through two fly-eye lenses FL, a polarization scrambler PS, and a condenser lens L in this order, and is converted into uniform light flux with uniform polarization.

The light flux that has passed through the condenser lenses L is separated into respective color component light beams of R, G, and B by dichroic mirrors DM, each of which reflects only light of a specific wavelength band. The color component light beams of R, G, and B enter respective liquid crystal panels P (image modulation elements) provided corresponding to RGB colors via total reflection mirrors M, lenses L, and the like. Then, by the respective liquid crystal panels P, light modulation according to a video signal is performed. The respective color component light beams subjected to the light modulation are combined by a dichroic prism PP to generate image light. Then, the generated image light is emitted toward the projection optical system 15.

The optical components and the like constituting the illumination optical system 10 are not limited, and optical components different from the above-mentioned optical components may be used. For example, as the image modulation element, a reflective liquid crystal panel, a digital micromirror device (DMD), or the like may be used instead of the transmissive liquid crystal panel P. Further, for example, instead of the dichroic prism PP, a polarization beam splitter (PBS), a color combining prism that combines respective video signals of RGB colors, a total internal reflection (TIR) prism, or the like may be used. In this embodiment, the illumination optical system 10 corresponds to an image generator.

The projection optical system 15 adjusts the image light emitted from the illumination optical system 10, and enlarges and projects it on a screen serving as a secondary image surface. That is, by the projection optical system 15, image information on the primary image surface (liquid crystal panel P) is adjusted, enlarged and projected on the secondary image surface (screen).

First Embodiment

[Image Display System]

Figure 3:
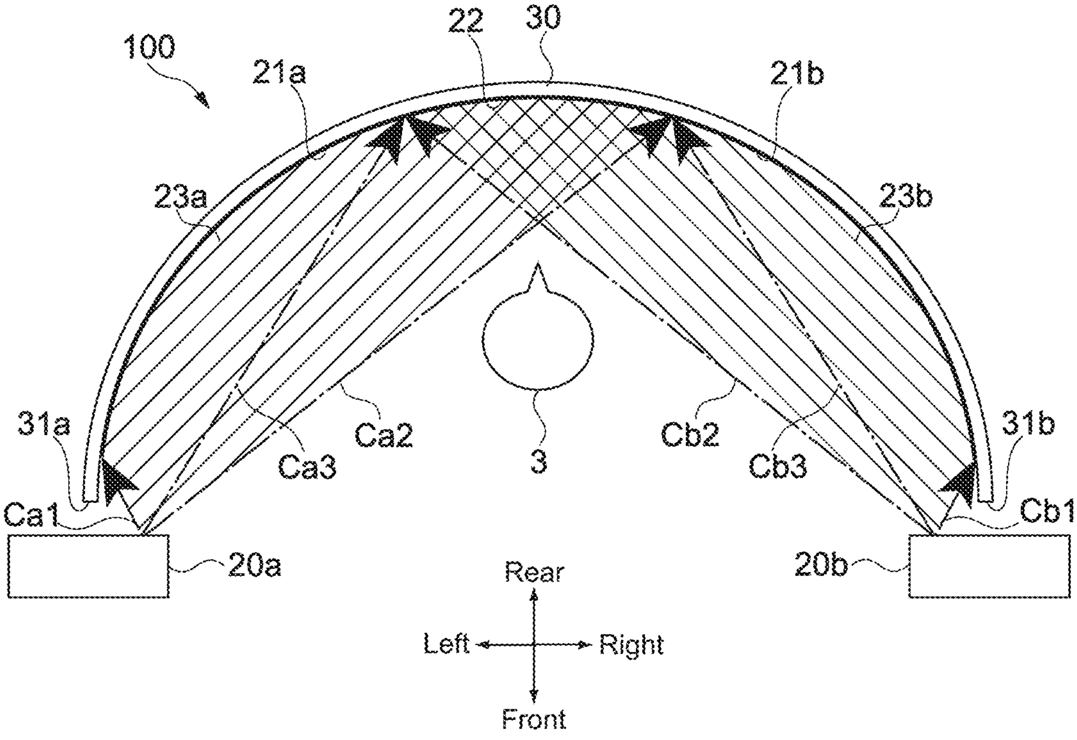
FIG. 3 is a schematic diagram illustrating a configuration example of an image display system according to a first embodiment.
Figure 4:
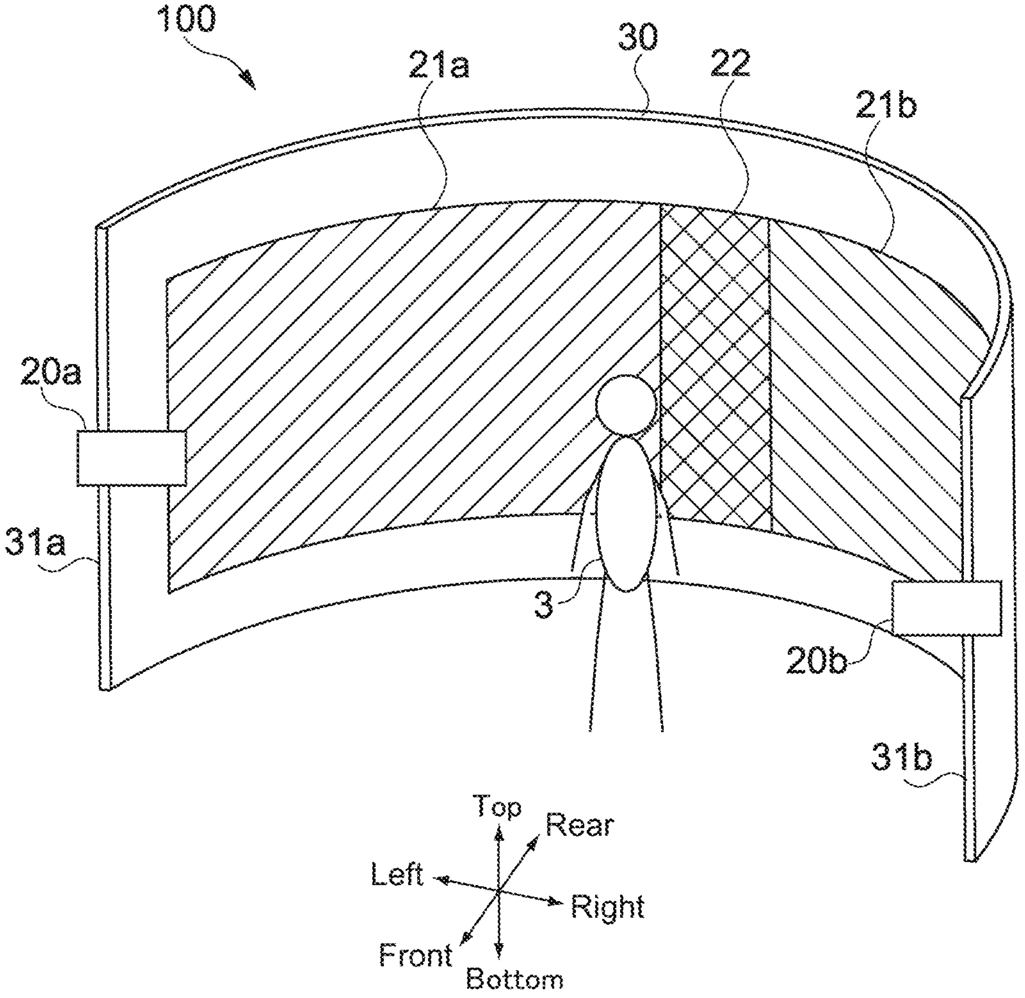
FIG. 4 is a schematic diagram illustrating the configuration example of the image display system according to the first embodiment.

FIG. 3 and FIG. 4 are schematic diagrams illustrating a configuration example of an image display system according to the first embodiment of the present technology. FIG. 3 is a diagram illustrating an image display system 100 viewed from above. FIG. 4 is a diagram illustrating the image display system 100 obliquely viewed from above a front right side.

The image display system 100 includes a curved screen 30 and two image display apparatuses 20. The curved screen 30 includes both a screen that is curved as a whole and a screen that is at least partially curved.

As illustrated in FIG. 3 and FIG. 4, the curved screen 30 used in the present embodiment has a substantially arc-like shape when viewed from above. The curved screen 30 is installed in such a manner that the curved screen 30 stands along an up-down direction and extends in a left-right direction. A left end 31*a* and a right end 31*b* of the curved screen 30 are curved toward a front side and are disposed at a substantially same position in a front-rear direction. The curved screen 30 has its approximate center in the left-right direction at a rearmost position. The approximate center of the curved screen 30 corresponds to a vertex of the substantially curved shape when viewed from above.

The shape of the curved screen 30 may also be represented as a shape that is substantially the same as a portion of an inner surface of a cylinder that stands along the up-down direction. Alternatively, the curved screen 30 may be configured by connecting tiny planner regions at different angles.

A specific configuration of the curved screen 30 such as material, size, and radius of curvature of the curved screen 30 are not limited. The curved screen 30 may be freely designed. In addition, the curved screen 30 may be obtained by attaching a flexible screen member to an inner surface of a substrate part that has the arc-like shape when viewed from above. In this embodiment, the curved screen 30 corresponds to a projection target.

The two image display apparatuses 20 includes a first image display apparatus 20*a* and a second image display apparatus 20*b*. The first image display apparatus 20*a* is installed at an approximate middle of the left end 31*a* of the curved screen 30 in the up-down direction in such a manner that the first image display apparatus 20*a* is capable of projecting an image rearward. The first image display apparatus 20*a* projects an image (hereinafter, referred to as a first image) 21*a* on a left region of the curved screen 30 that is curved in the arc-like shape.

The second image display apparatus 20*b* is installed at an approximate middle of the right end 31*b* of the curved screen 30 in the up-down direction in such a manner that the second image display apparatus 20*b* is capable of projecting an image rearward. The second image display apparatus 20*b* projects an image (hereinafter, referred to as a second image) 21*b* on a right region of the curved screen 30 that is curved in the arc-like shape. Note that, it is possible to freely design holder mechanisms (not illustrated) that hold the first image display apparatus 20*a* and the second image display apparatus 20*b*.

As illustrated in FIG. 3 and FIG. 4, the first image display apparatus 20*a* and the second image display apparatus 20*b* respectively project the first image 21*a* and the second image 21*b* in such a manner that the first image 21*a* and the second image 21*b* overlap each other.

In the present embodiment, the image modulation element (liquid crystal panel P) included in each of the first image display apparatus 20*a* and the second image display apparatus 20*b* has a rectangular shape constituted of long sides and short sides. The liquid crystal panel P generates image light that constitutes a rectangular image.

The first image 21*a* and the second image 21*b* are each projected as an image having the same rectangular shape. In addition, the first image 21*a* and the second image 21*b* are projected in such a manner that the first image 21*a* and the second image 21*b* overlap each other along the long-side direction (left-right direction) of the first image 21*a* and the second image 21*b*. This makes it possible to generate an overlap region 22 at the approximate center of the curved screen 30. In the overlap region 22, the first image 21*a* and the second image 21*b* overlap each other.

According to the present embodiment, stitching processing is performed on the overlap region 22 where the first image 21*a* and the second image 21*b* overlap each other. This makes it possible to connect the first image 21*a* and the second image 21*b* to synthesize a single image. As a result, the single image of large size is displayed in substantially the whole region of the curved screen 30 along the left-right direction. A specific algorithm or the like for the stitching processing is not limited. It is possible to use any stitching technologies.

FIG. 3 schematically illustrates a first image light 23*a* and pixel light beams Ca1, Ca2, and Ca3. The first image light 23*a* constitutes the first image 21*a* projected by the first image display apparatus 20*a*. The pixel light beams Ca1, Ca2, and Ca3 are included in the first image light 23*a*.

In addition, FIG. 3 schematically illustrates a first image light 23*b* and pixel light beams Cb1, Cb2, and Cb3. The second image light 23*b* constitutes the second image 21*b* projected by the second image display apparatus 20*b*. The pixel light beams Cb1, Cb2, and Cb3 are included in the second image light 23*b*.

Note that, the respective pixel light beams are light constituting a plurality of pixels included in the projected image. Typically, the respective pixel light beams are light emitted from the plurality of pixels included in the image modulation element (liquid crystal panel P) that generates and emits the image light. Therefore, the image light includes the plurality of pixel light beams.

The pixel light beam Ca1 illustrated in FIG. 3 is a pixel light beam that constitutes a pixel at the left end of the first image 21*a*. Therefore, the pixel light beam Ca1 corresponds to a light beam of the left end of the first image light 23*a*. The pixel light beam Ca2 is a pixel light beam that constitutes a pixel at the right end of the first image 21*a*. Therefore, the pixel light beam Ca2 corresponds to a light beam of the right end of the first image light 23*a*.

The pixel light beam Ca3 is a pixel light beam that constitutes a pixel at the left end of the overlap region 22 where the first image 21*a* and the second image 21*b* overlap each other. Therefore, among the light beams included in the first image light 23*a*, light beams corresponding to the pixel light beams Ca3 to Ca2 serve as image light that constitutes the overlap region 22. On the other hand, among the light beams included in the first image light 23*a*, light beams corresponding to the pixel light beams Ca1 to Ca3 serve as image light that constitutes a region other than the overlap region 22.

The pixel light beam Cb1 illustrated in FIG. 3 is a pixel light beam that constitutes a pixel at the right end of the second image 21*b*. Therefore, the pixel light beam Cb1 corresponds to a light beam of the right end of the second image light 23*b*. The pixel light beam Cb2 is a pixel light beam that constitutes a pixel at the left end of the second image 21*b*. Therefore, the pixel light beam Cb2 corresponds to light beam of the left end of the first image light 23*a*.

The pixel light beam Ca3 is a pixel light beam that constitutes a pixel at the right end of the overlap region 22. Therefore, among the light beams included in the second image light 23*b*, light beams corresponding to the pixel light beams Cb3 to Cb2 serve as image light that constitutes the overlap region 22. On the other hand, among the light beams included in the second image light 23*b*, light beams corresponding to the pixel light beams Cb1 to Cb3 serve as image light that constitutes a region other than the overlap region 22.

As illustrated in FIG. 3, in the present embodiment, the first image display apparatus 20*a* and the second image display apparatus 20*b* respectively project the first image 21*a* and the second image 21*b* in such a manner that beams of image light that constitute the regions other than the overlap region 22 where the first image 21*a* and the second image 21*b* overlap each other do not intersect with each other.

This makes it possible to sufficiently suppress generation of a shadow of a user 3 who is standing at a position close to the overlap region 22 generated at the approximate middle of the curved screen 30. As a result, it is possible for the user 3 in a region inside the curved screen 30 that is curved in the arc-like shape (for example, at a position close to the overlap region 22), to watch the first image 21*a* and the second image 21*b* combined as the single image. This makes it possible to provide a great sense of immersion into content and excellent visual effects for the user 3.

The overlapping direction of the first image 21*a* and the second image 21*b* is not limited. For example, the first image 21*a* and the second image 21*b* may be projected in such a manner that the first image 21*a* and the second image 21*b* overlap each other along the short-side direction of the first image 21*a* and the second image 21*b*. For example, according to the configuration example illustrated in FIG. 3 and FIG. 4, the first image 21*a* and the second image 21*b* are projected. The first image 21*a* and the second image 21*b* have rectangular shapes and their short sides coincide with the left-right direction. In addition, the first image 21*a* and the second image 21*b* may be projected in such a manner that the first image 21*a* and the second image 21*b* overlap each other along the short-side direction of the first image 21*a* and the second image 21*b*.

In the case of projecting image light that constitutes a rectangular image, sometimes the image may be displayed in a shape that is different from the rectangular shape depending on the shape of the curved screen 30. In this case, the directions may be defined in such a manner that the long sides of the liquid crystal panel P correspond to the long sides of the image and the short sides of the liquid crystal panel P correspond to the short sides of the image. Next, it is possible to overlap a plurality of images along the long-side direction or the short-side direction. According to the present disclosure, sometimes the long-side direction of the liquid crystal panel P may be referred to as the long-side direction of the image light, and the short-side direction of the liquid crystal panel P may be referred to as the short-side direction of the image light.

Details of the configuration examples of the first image display apparatus 20*a*, the second image display apparatus 20*b*, and the curved screen 30 will be described. In the present embodiment, image display apparatuses having substantially the same configuration are used as the first image display apparatus 20*a* and the second image display apparatus 20*b*. Next, the projection optical systems 15 of the first image display apparatus 20*a* and the second image display apparatus 20*b*, and the curved screen 30 will be described.

Figure 5:
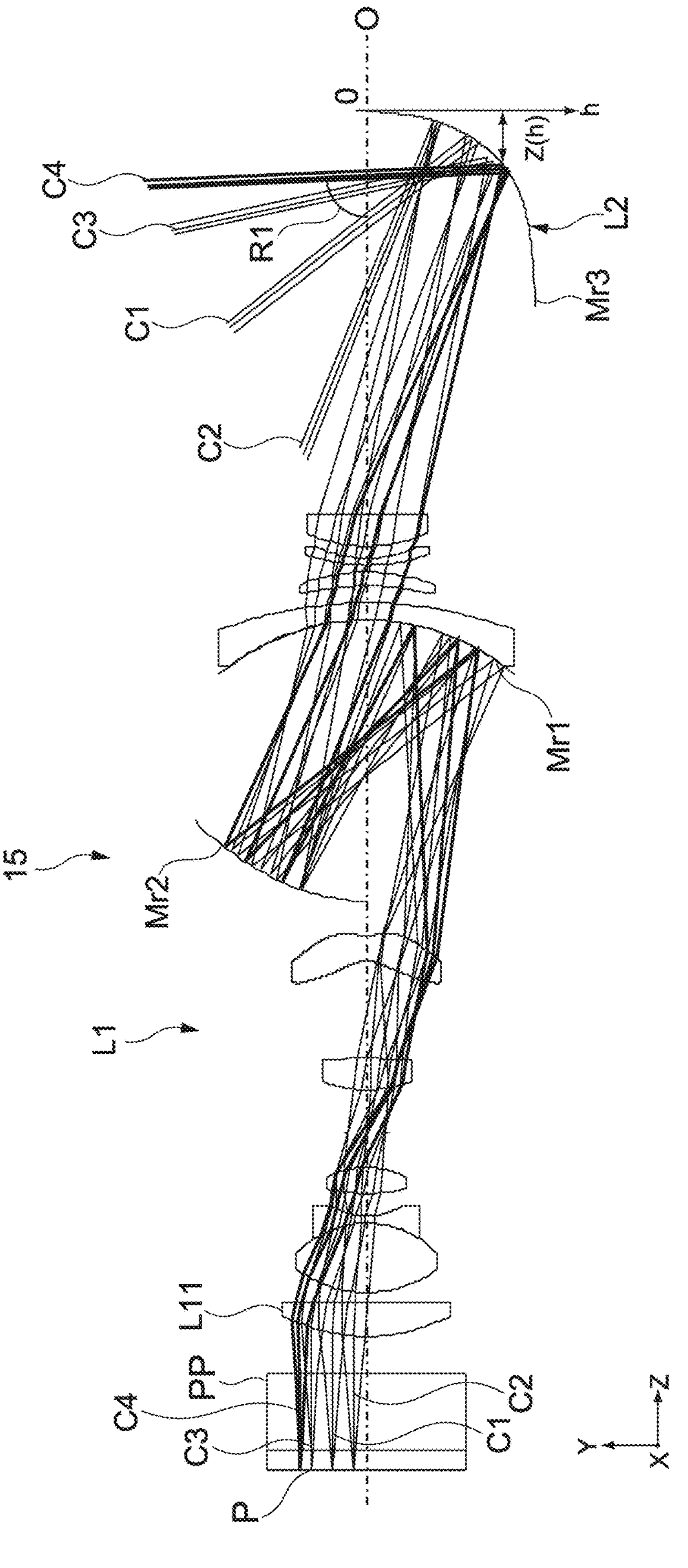
FIG. 5 is an optical path diagram illustrating a schematic configuration example of a projection optical system according to the first embodiment.
Figures 6, 7:
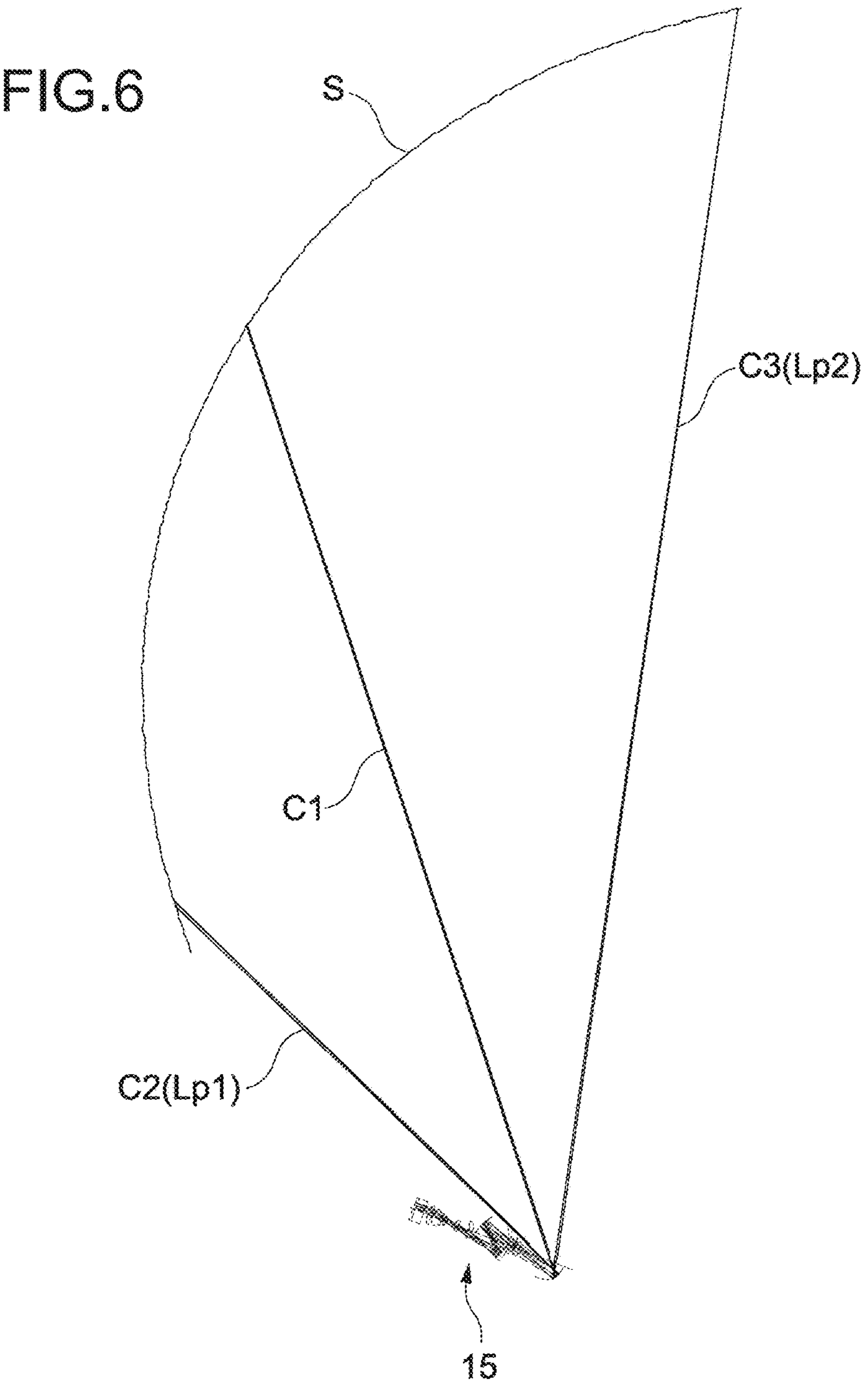
FIG. 6 is an optical path diagram illustrating the schematic configuration example of the projection optical system according to the first embodiment.
FIG. 7 is a table illustrating an example of parameters relating to image projection.

FIG. 5 and FIG. 6 are optical path diagrams illustrating a schematic configuration example of the projection optical system 15 according to the present embodiment. Note that, FIG. 6 illustrates the single projection optical system 15 and a portion S of the curved screen where an image is projected. By symmetrically combining two sets of the structural elements illustrated in FIG. 6, it is possible to achieve the image display system 100 including the curved screen 30, the first image display apparatus 20*a*, and the second image display apparatus 20*b* as illustrated in FIG. 3 and FIG. 4.

In addition, FIG. 5 and FIG. 6 schematically illustrate the liquid crystal panel P and the dichroic prism PP of the illumination optical system 10. Hereinafter, a Z direction represents an emission direction of image light emitted from the dichroic prism PP to the projection optical system 15. In addition, an X direction represents a lateral direction of the primary image surface (liquid crystal panel P), and a Y direction represents a longitudinal direction of the primary image surface (liquid crystal panel P). The X direction is a direction corresponding to a lateral direction of an image constituted of the image light, and the Y direction is a direction corresponding to a longitudinal direction of the image constituted of the image light.

The projection optical system 15 includes a first optical system L1 and a second optical system L2. The first optical system L1 is configured at a position on which the image light generated by the illumination optical system 10 is incident, and the first optical system L1 has a positive refracting power as a whole. In addition, the first optical system L1 is configured on the basis of a reference axis extending in the Z direction (hereinafter, the reference axis is referred to as an optical axis O).

As illustrated in FIG. 5, in the present embodiment, the first optical system L1 is configured to include one or more optical components having respective optical axes that substantially coincides with the optical axis O serving as the reference axis. Note that, typically, the optical axis of each of the optical components is an axis that passes through a center of an optical surface such as a lens surface or a reflective surface of the optical component. For example, an axis of rotational symmetry corresponds to the optical axis in the case where the optical surface of the optical component has the axis of rotational symmetry.

In the present embodiment, the optical axis O is an axis obtained by extending an optical axis (axis of rotational symmetry) of a lens L11 that is included in the first optical system L1 and situated closest to the illumination optical system 10. In other words, optical components other than the lens L11 are arranged on the axis obtained by extending the optical axis of the lens L11. Note that image light is emitted along the optical axis O from a position to which the optical axis O is offset in a vertical direction (Y direction). In the present embodiment, the first optical system L1 corresponds to a lens system. In addition, the direction along the optical axis O may also be referred to as a propagation direction of an optical path of the first optical system L1.

As illustrated in FIG. 5, the first optical system L1 includes a first reflective surface Mr1 and a second reflective surface Mr2. The first reflective surface Mr1 and the second reflective surface Mr2 are concave reflective surfaces. The first reflective surface Mr1 is a rotationally symmetric spherical surface configured to have an axis of rotational symmetry that coincides with the optical axis O.

The second reflective surface Mr2 is a rotationally symmetric aspherical surface configured to have an axis of rotational symmetry that coincides with the optical axis O, and the second reflection surface Mr2 has an available region consisting only of a reflective portion, the available region being a region where the image light enters. In other words, the entire rotationally symmetric aspherical surface is not arranged, but only a necessary portion of the rotationally symmetric aspherical surface is arranged. This makes it possible to make the apparatus smaller.

The second optical system L2 includes a concave reflective surface Mr3. The concave reflective surface Mr3 is configured on the basis of the optical axis O serving as the reference axis. The concave reflective surface Mr3 reflects the image light emitted from the first optical system L1 toward the curved screen S (curved screen 30).

The concave reflective surface Mr3 is a rotationally symmetric aspherical surface configured to have an axis of rotational symmetry (optical axis) that coincides with the optical axis O, and the concave reflective surface Mr3 has an available region consisting only of a reflective portion, the available region being a region where the image light enters. In other words, the entire rotationally symmetric aspherical surface is not arranged, but only a necessary portion of the rotationally symmetric aspherical surface is arranged. This makes it possible to make the apparatus smaller.

As illustrated in FIG. 5, in the present embodiment, the first optical system L1 and the second optical system L2 (concave reflective surface Mr3) are configured on the optical axis O in common. In other words, the first optical system L1 and the second optical system L2 are configured such that the axis obtained by extending the optical axis (axis of rotational symmetry) of the lens L11 situated closest to the illumination optical system 10 substantially coincides with the respective optical axes (axes of rotational symmetry) of the first optical system L1 and the second optical system L2. This makes it possible to reduce the size in the Y direction, and thus to make the apparatus smaller.

With reference to FIG. 5 and FIG. 6, optical paths of the image light will be described. FIG. 5 illustrates optical paths of four pixel light beams C1, C2, C3, and C4 among the image light emitted from the dichroic prism PP to the projection optical system 15. FIG. 6 illustrates the optical paths of the three pixel light beams C1, C2, and C3.

As described later with reference to FIG. 8, the pixel light beam C1 corresponds to a pixel light beam emitted from a central pixel of the liquid crystal panel P. The pixel light beam C2 corresponds to a pixel light beam emitted from a middle pixel situated closest to the optical axis O in the liquid crystal panel P. corresponds to a pixel light beam emitted from a middle pixel situated farthest from the optical axis O in the liquid crystal panel P. The pixel light beam C4 corresponds to a pixel light beam emitted from a pixel situated at an upper right end of the liquid crystal panel P.

In other words, in the present embodiment, the pixel light beam C2 corresponds to the pixel light beam emitted from the pixel situated closest to the optical axis O in the liquid crystal panel P. In addition, the pixel light beam C3 corresponds to the pixel light beam emitted from the pixel situated farthest from the optical axis O on a straight line connecting the pixel situated closest to the optical axis O with the central pixel of the liquid crystal panel P.

The image light emitted along the optical axis O to the projection optical system 15 from the position to which the optical axis O is offset in the vertical direction propagates and enters the first reflective surface Mr1 in such a manner that the image light intersects with the optical axis O. The image light incident on the first reflective surface Mr1 is turned back by the first reflective surface Mr1, propagates while intersecting with the optical axis O again, and then enters the second reflective surface Mr2.

The image light incident on the second reflective surface Mr2 is turned back by the second reflective surface Mr2, and then emitted from the first optical system L1. The image light is emitted toward the concave reflective surface Mr3 in such a manner that the image light intersects with the optical axis O again. The image light emitted from the first optical system L1 is reflected by the concave reflective surface Mr3 serving as the second optical system L2, intersects with the optical axis O again, and then is projected toward the curved screen S.

As described above, in the present embodiment, the optical paths of the image light are configured in such a manner that the optical paths intersect with the optical axis O. This makes it possible to configure the optical paths of the image light to the concave reflective surface Mr3 near the optical axis O. This results in being able to reduce the size of the apparatus in the Y direction, and thus to make the apparatus smaller.

In addition, the first reflective surface Mr1 and the second reflective surface Mr2 reflect the image light in such a manner that the image light is turned back. This makes it possible to maintain sufficient lengths of the optical paths of the image light. This results in being able to reduce the size of the apparatus in the X direction, and thus to make the apparatus smaller.

As illustrated in FIG. 5 and FIG. 6, in the present embodiment, the concave reflective surface Mr3 reflects at least one or more light beams included in the image light incident on the concave reflective surface Mr3, toward directions that intersect with a direction along the optical axis O serving as the reference axis at angles of 80 degrees or more.

The angles of intersection between the direction along the optical axis O and the propagation directions of the light beams included in the image light reflected by the concave reflective surface Mr3 are defined as described below. First, a point of intersection between a straight line extending along the optical axis O and a straight line extending along a propagation direction of a light beam reflected by the concave reflective surface Mr3 is calculated. The straight line extending from the point of intersection to the liquid crystal panel P side is rotated about the point of intersection toward the propagation direction of the light beam. In this case, a rotation angle obtained when the straight line extending from the point of intersection to the liquid crystal panel P side coincides with the straight line extending along the propagation direction of the light beam is defined as the angle of intersection between the direction along the optical axis O and the propagation direction of the light beam included in the image light reflected by the concave reflective surface Mr3.

In the present embodiment, the concave reflective surface Mr3 is designed in such a manner that the above-defined angles of intersection of at least one or more light beams included in the image light reflected by the concave reflective surface Mr3 are 80 degrees or more.

In the example illustrated in FIG. 5, the pixel light beam C4 included in the image light is reflected toward a direction that intersects with the direction along the optical axis O at an angle of 80 degrees or more. As illustrated in FIG. 5, the angle of intersection between the direction along the optical axis O and the propagation direction of the pixel light beam C4 reflected by the concave reflective surface Mr3 is an angle R1. The angle R1 is 87.4 degrees.

Note that, the angle R1 is the maximum angle of intersection. In other words, the pixel light beam C4 is a light beam with the largest angle of intersection. The other light beams are reflected in directions that intersect with the direction along the optical axis O at smaller angles than the angle R1 (87.4 degrees).

In the above description, the pixel light beams have been used as an example of the light beams included in the image light. However, the light beams are not limited thereto as long as at least one or more light beams among other light beams or the like included in image light are reflected toward directions that intersect with the direction along the optical axis O at angles of 80 degrees or more.

The image display apparatuses 20, each of which includes the projection optical system 15 exemplified in FIG. 5 and FIG. 6, are installed in such a manner that the concave reflective surfaces Mr3 are disposed at positions corresponding to the shape of the curved screen S. By designing the concave reflective surface Mr3 with large angles of intersection, it is possible to display a high-quality image corresponding to the curved screen S. Details thereof will be described later.

The present inventors found out four conditions (1) to (4) regarding display of an image corresponding to a curved screen. These conditions will be described with reference to FIG. 5 and FIG. 6.

(First Condition)

θ1 represents the angle of the intersection between the direction along the optical axis O serving as the reference axis and a propagation direction of each of light beams included in the image light reflected by the concave reflective surface Mr3. The angle θ1 corresponds to the above-defined angle of intersection.

θ1 max represents an angle θ1 of a light beam having a maximum angle θ1. In the example illustrated in FIG. 5, the angle of intersection of the pixel light beam C4 is θ1 max.

In this case, the projection optical system 15 is configured to satisfy the following relationship:

$$80\ \text{degrees} \le \theta 1\ \max \le 160\ \text{degrees}. \qquad (1)$$

The conditional expression (1) is for regulating appropriate angles of reflection of light beams included in the image light. In the case where θ1 max is less than the lower limit defined by the conditional expression (1), the light beam is not reflected at a large angle, and it is difficult to deal with the curved screen S. In the case where θ1 max exceeds the upper limit defined by the conditional expression (1), it is highly possible that the light beam interferes with the concave reflective surface Mr3. In other words, it is highly possible that the light beam enters another portion of the concave reflective surface Mr3 again after being reflected by the concave reflective surface Mr3.

The angle of intersection of the pixel light beam C4 is 87.4 degrees, and this satisfies the first condition.

(Second Condition)

The concave reflective surface Mr3 is configured to have the axis of rotational symmetry that coincides with the optical axis O serving as the reference axis.

h represents a height of a light beam of light incident on the concave reflective surface Mr3, above the optical axis O.

Z'(h)(=dZ/dh) represents a derivative function obtained by differentiating a function Z(h) with respect to the height of the light beam. The function Z(h) represents a shape of the concave reflective surface Mr3 corresponding to the height of the light beam. Therefore, the derivative function Z'(h) corresponds to slope of a straight line that is in contact with the concave reflective surface Mr3 at the height h of the light beam.

hmax represents a height of the light beam corresponding to a reflection point situated farthest from the optical axis O for reflecting the image light.

Z'ave. represents an average value of the Z'(h) from the optical axis O to the height hmax of the light beam.

In this case, the projection optical system 15 is configured to satisfy the following relationship:

$$1 < |Z'(1.0 \cdot h\ \max) - Z'(0.9 \cdot h\ \max)| / |Z'ave.| < 20. \qquad (2)$$

The conditional expression (2) is for regulating appropriate angles of reflection of light beams included in the image light. In the case where |Z'(1.0·hmax)−Z'(0.9·hmax)|/|Z'ave.| is less than the lower limit defined by the conditional expression (2), the light beam is not reflected at a large angle, and it is difficult to deal with the curved screen S. In the case where |Z'(1.0·hmax)−Z'(0.9·hmax)|/|Z'ave.| exceeds the upper limit defined by the conditional expression (2), it is highly possible that the light beam interferes with the concave reflective surface Mr3. In other words, it is highly possible that the light beam enters another portion of the concave reflective surface Mr3 again after being reflected by the concave reflective surface Mr3.

(Third Condition)

Lp1 represents a length of an optical path of a pixel light beam emitted to the curved screen S from a pixel situated closest to the optical axis O in the liquid crystal panel P. Lp2 represents a length of an optical path of a pixel light beam emitted to the curved screen S from a pixel situated farthest from the optical axis O on a straight line connecting the pixel situated closest to the optical axis O with the central pixel of the liquid crystal panel P. In the present embodiment, Lp1 represents the length of the optical path of the pixel light beam C2, and Lp2 represents the length of the optical path of the pixel light beam C3.

In this case, the projection optical system 15 and the curved screen S are configured to satisfy the following relationship:

$$0.005 < Lp1/Lp2 < 0.5. \qquad (3)$$

The conditional expression (3) corresponds to a conditional expression for defining a region that allows the user 3 illustrated in FIG. 3 to move. In the case where Lp1/Lp2 is less than the lower limit defined by the conditional expression (3), it is possible to suppress generation of a shadow of the user 3 even when the user 3 stands near the screen S. This makes it possible to enlarge a region that allows the user 3 to move. On the other hand, this may increase a possibility of deteriorating its optical performance because of a large difference between the lengths of the optical paths. In the case where Lp1/Lp2 exceeds the upper limit defined by the conditional expression (3), the user 3 interferes with the light beams unless the user 3 is situated away from the screen S. This causes generation of the shadow of the user 3. In addition, it is necessary to distance the projection optical system 15 from the curved screen S, and this results in increase in the size of the whole apparatus.

(Fourth Condition)

Ln represents a length of an optical path of a shortest light beam to the curved screen S, and Lf represents a length of an optical path of a longest light beam to the curved screen S among the light beams included in the image light. In the example illustrated in FIG. 6, Ln is the length of the optical path of the pixel light beam C2, and Lf is the length of the optical path of the pixel light beam C3.

In this case, the projection optical system 15 and the curved screen S are configured to satisfy the following relationship:

$$0.005 < Ln/Lf < 0.5. \qquad (4)$$

In a way similar to the conditional expression (3), the conditional expression (3) also corresponds to a conditional expression for defining a region that allows the user 3 illustrated in FIG. 3 to move. In other words, in the case where Ln/Lf is less than the lower limit defined by the conditional expression (4), it is possible to suppress generation of a shadow of the user 3 even when the user 3 stands near the screen S. This makes it possible to enlarge a region that allows the user 3 to move. On the other hand, this may increase a possibility of deteriorating its optical performance because of a large difference between the lengths of the optical paths. In the case where Ln/Lf exceeds the upper limit defined by the conditional expression (4), the user 3 interferes with the light beams unless the user 3 is situated away from the screen S. This causes generation of the shadow of the user 3. In addition, it is necessary to distance the projection optical system 15 from the curved screen S, and this results in increase in the size of the whole apparatus.

The lower limit and the upper limit defined in each of the conditional expressions (1) to (4) are not limited to the values described above. For example, the lower limit and the upper limit can also be changed as appropriate, according to the configurations of the illumination optical system 10, the projection optical system 15, the curved screen S, and the like. For example, any values included in each of the ranges described above may be selected to be a lower limit and an upper limit, and an optimal range may be set again using the selected values.

For example, the following ranges can be set with respect to the conditional expression (1):

85 degrees≤θ1 max≤160 degrees;

80 degrees≤θ1 max≤140 degrees; or 85 degrees≤θ1 max≤140 degrees.

For example, the following ranges can be set with respect to the conditional expression (2):

$1<|Z'(1.0\cdot h\ \max)-Z'(0.9\cdot h\ \max)|/|Z'ave.|<10$; or $2<|Z'(1.0\cdot h\ \max)-Z'(0.9\cdot h\ \max)|/|Z'ave.|<10$.

The projection optical system 15 having the configuration described above will be briefly described using specific examples of values.

FIG. 7 is a table illustrating an example of parameters relating to image projection. FIG. 8 is a schematic diagram for describing the parameters illustrated in FIG. 7.

The numerical aperture NA of the projection optical system 15 on the primary image surface side is 0.127. The lateral length and the longitudinal length (H×VSp) of the image modulation element (liquid crystal panel P) are 8.2 mm and 4.6 mm, respectively. The center position (Chp) of the image modulation element is situated 3.7 mm above the optical axis O. The image circle (imc) on the primary image surface side is φ14.6 mm.

Figure 8:
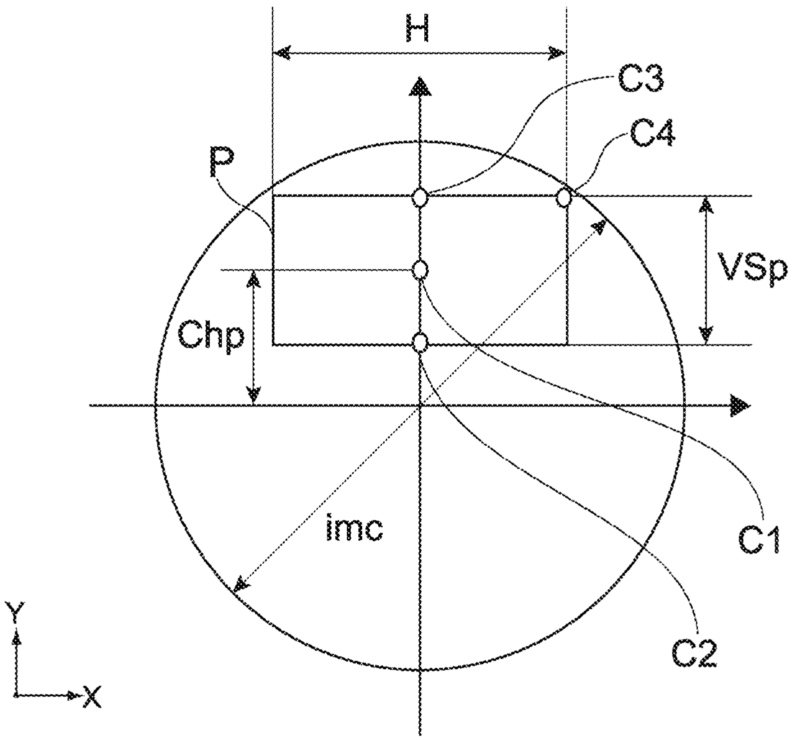
FIG. 8 is a schematic diagram for describing the parameters illustrated in FIG. 7.

As described above, light emitted from the central pixel of the liquid crystal panel P illustrated in FIG. 8 corresponds to the pixel light beam C1 illustrated in FIG. 5 and the like (they are denoted by the same reference sign). Light emitted from the middle pixel situated closest to the optical axis O in the liquid crystal panel P corresponds to the pixel light beam C2 (they are denoted by the same reference sign). Light emitted from the middle pixel situated farthest from the optical axis O in the liquid crystal panel P corresponds to the pixel light beam C3 (they are denoted by the same reference sign).

Light emitted from the pixel situated at the upper right end of the liquid crystal panel P corresponds to the pixel light beam C4 illustrated in FIG. 5 and the like (they are denoted by the same reference sign). In the present embodiment, the pixel light beam C4 emitted from this pixel is reflected by the concave reflective surface Mr3 to the direction that intersects with the direction along the optical axis O at the angle of 80 degrees or more.

FIG. 9 illustrates lens data of the image display apparatus and data of the curved screen. FIG. 9 illustrates data regarding the curved screen S and optical components (lens surfaces) 1 to 24 that are arranged from the primary image surface (P) side to the secondary image surface (S) side. The data regarding the respective optical components (lens surfaces) includes curvature radii (mm), core thickness d (mm), refractive indices nd at a d line (587.56 nm), and the Abbe numbers νd at the d line. The data regarding the curved screen S includes a curvature radius (mm).

Note that optical components having an aspherical surface conforms to the following expression.

$$Z=\frac{ch^2}{1+\{1-(1+K)c^2h^2\}1/2}+\sum_{i=1}Aih^1 \quad \text{[Math. 1]}$$

FIG. 10 is a table illustrating an example of aspheric coefficients of optical components included in the projection optical system. FIG. 10 illustrates aspheric coefficients of the optical components 12, 13, 15, and 24, each of which has an aspherical surface and is denoted by an asterisk (*) in FIG. 9. The aspheric coefficients exemplified in FIG. 10 conform to the expression listed above (Math. 1).

Note that, in the present embodiment, the expression (Math. 1) corresponds to the function Z(h) that represents the shape of the concave reflective surface Mr3 corresponding to the height of the light beam. A sag amount Z obtained by inputting the height h of the light beam illustrated in FIG. 5 into the expression (Math. 1) is used as a parameter that represents the shape of the concave reflective surface Mr3 corresponding to the height of the light beam. Note that, the "sag amount" represents a distance along the optical axis direction between a point on a lens surface and a plane that passes through the apex of the lens surface and is perpendicular to the optical axis.

Therefore, a derivative function Z'(h)(=dZ/dh) obtained by differentiating the function Z(h) with respect to the height of the light beam is as follows.

$$\frac{dZ}{dh}=\frac{2ch}{1+\{1-(1+K)c^2h^2\}1/2}+\frac{(1+K)c^3h^3}{\{1-(1+K)c^2h^2\}1/2*[1+\{1-(1+K)c^2h^2\}1/2]^2}+A_1+2A_2h+3A_3H^2+\ldots \quad \text{[Math. 2]}$$

As described above, by using this expression, it is possible to calculate the slope of the straight line that is in contact with the concave reflective surface Mr3 at the height h of the light beam.

The curved screen S is decentered and tilted toward the optical axis O. FIG. 10 illustrates decentering components in the X, Y, and Z directions and rotational components about the respective X, Y, and Z axes with regard to the curved screen S.

With respect to decentering of a surface, XDE, YDE, and ZDE exemplified in FIG. 10 respectively represent a component in the X direction (in units of mm), a component in the Y direction (in units of mm), and a component in the Z direction (in units of mm). With respect to rotation of a surface, ADE, BDE, and CDE respectively represent a component in a θx direction (rotational component about the X axis (in units of degrees)), a component in a θy direction (rotational component about the Y axis (in units of degrees)), and a component in a θz direction (rotational component about the Z axis (in units of degrees)).

FIG. 11 is a table illustrating the Z(h) and the Z'(h) corresponding to a height h of a light beam. In FIG. 11, "shape" represents sag amounts that are the Z(h) (in units of mm). In addition, "thita" represents the slope of a tangent line that is the Z'(h). In addition, in FIG. 11, "Δθ" represents an amount of displacement of the slope of the tangent line depending on displacement of the height h of the light beam. Note that, calculation is performed after normalizing the height h of the light beam on the assumption that the height of the light beam on the optical axis O is 0 and the height hmax of the light beam is 1.

Figure 12:
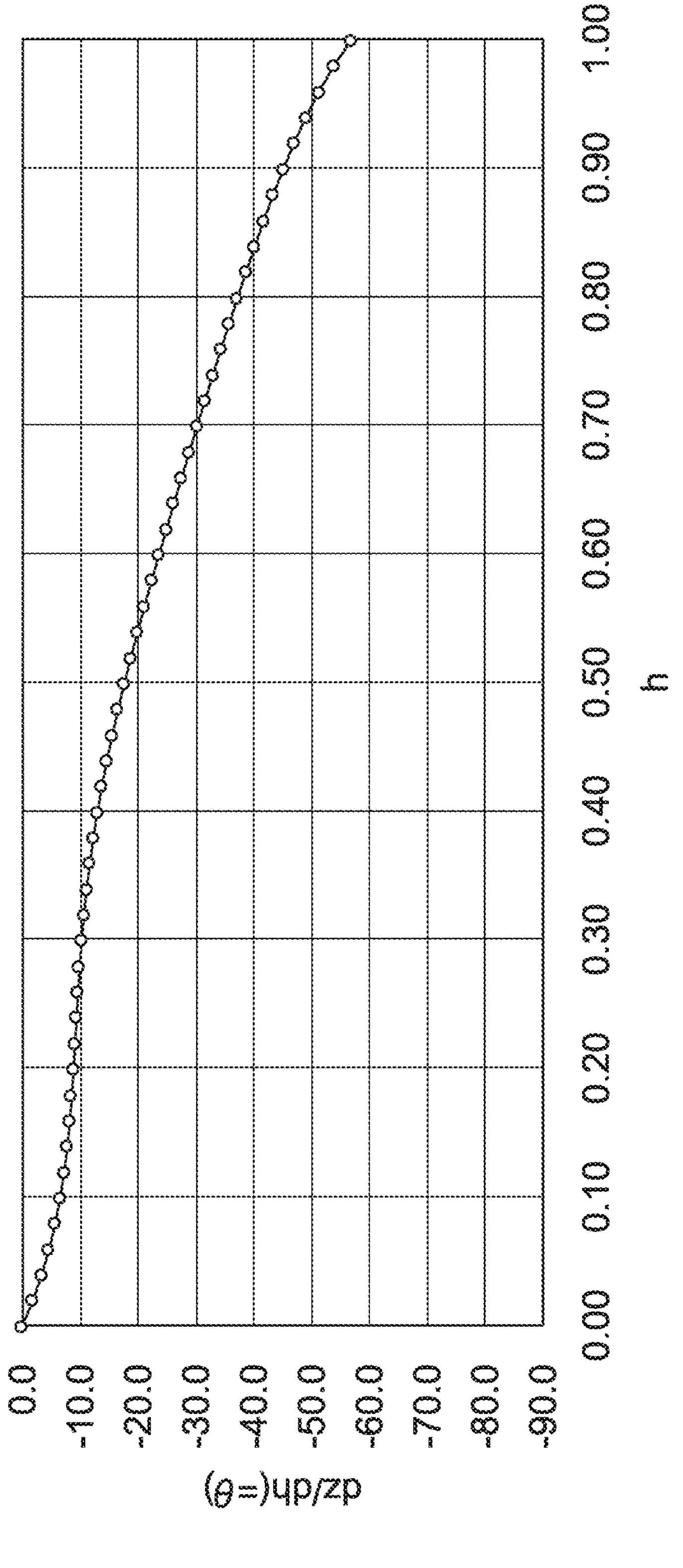
FIG. 12 is a graph illustrating a relationship between the height h of the light beam and "thita".
Figure 13:
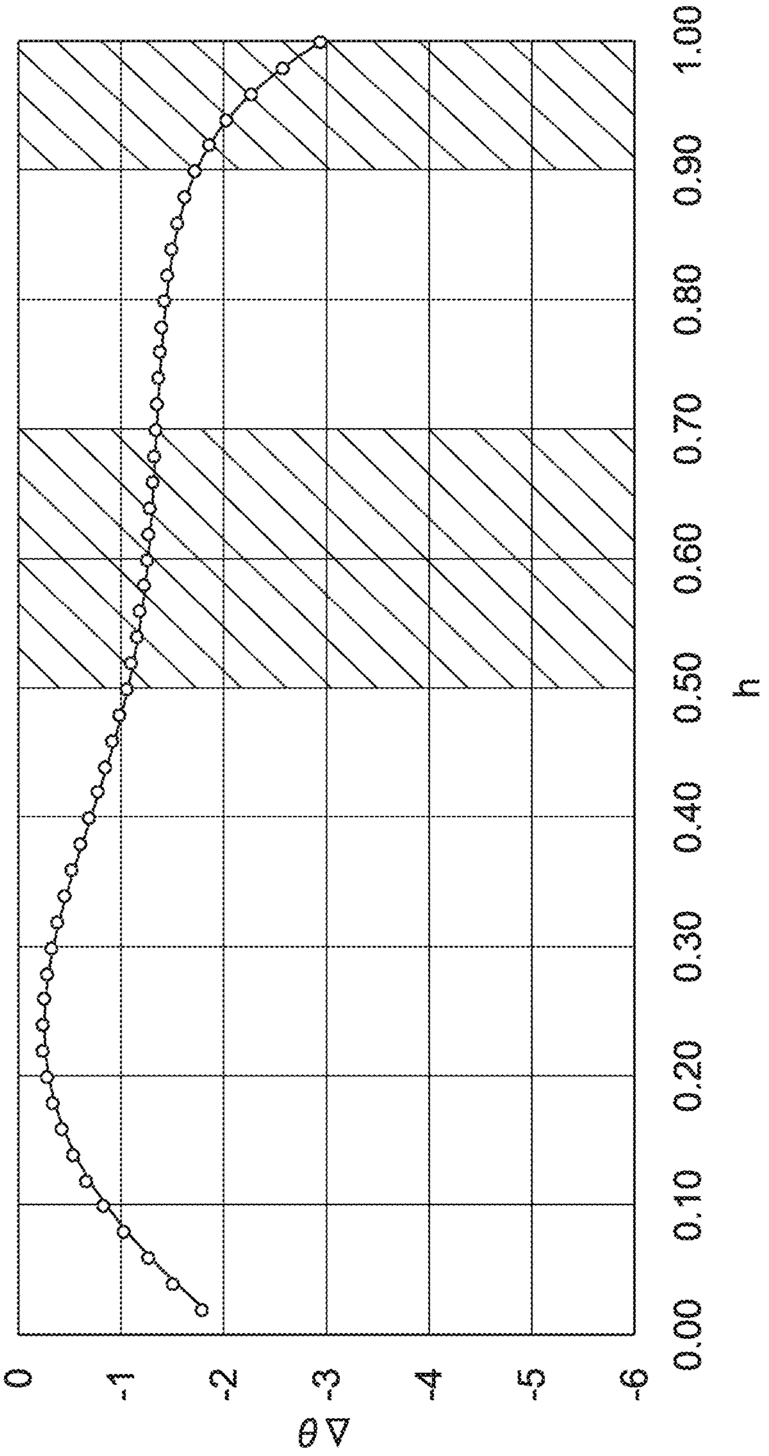
FIG. 13 is a graph illustrating a relationship between the height h of the light beam and "Δθ".

FIG. 12 is a graph illustrating a relationship between the height h of the light beam and "thita". FIG. 13 is a graph illustrating a relationship between the height h of the light beam and "Δθ". It is understood that the slope of the tangent line changes drastically with regard to the light beam having the height of 0.9 to 1.00, which is away from the optical axis O. This means that large curvature is obtained in the case of the light beam having the height of 0.9 to 1.00. This makes it possible to increase the angle θ1 of intersection.

FIG. 14 is a table illustrating values of parameters used in conditional expressions (2) to (4) listed above according to the present embodiment.

$|Z'(1.0 \cdot h\ \mathrm{max}) - Z'(0.9 \cdot h\ \mathrm{max})|$ 11.8

$|Z'ave.|$ 5.7

$|Z'(1.0 \cdot h\ \mathrm{max}) - Z'(0.9 \cdot h\ \mathrm{max})|/|Z'ave.|$ 2.07

Length of optical path of C1 1031.11 mm

Length of optical path of C2 (=Lp1=Ln) 634.76 mm

Length of optical path of C3 (=Lp2=Lf) 1311.61 mm

Length of optical path of C4 1236.61 mm

Lp1/Lp2 0.48

Ln/Lf 0.48

The results described above are obtained, and it is understood that the conditional expressions (2) to (4) are satisfied.

As described above, the image display apparatus 100 according to the present embodiment uses the concave reflective surface Mr3 to reflect at least one or more light beams included in the image light, toward a direction that intersects with the direction along the optical axis O at an angle of 80 degrees or more. The optical axis O serves as a criterion for configuring the projection optical system 15. This makes it possible to deal with projection of an image on, for example, the curved screen S or the like, and display images with high quality.

Figure 15:
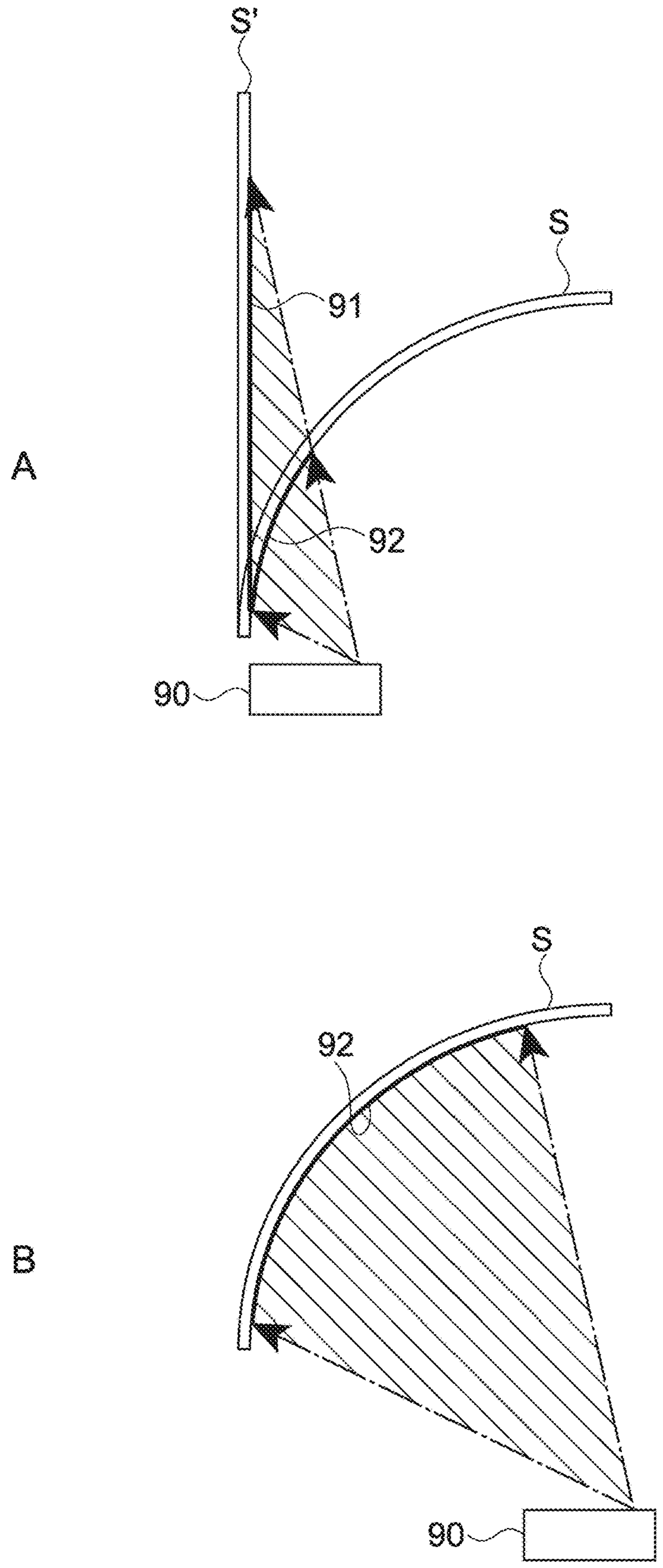
FIG. 15 is a schematic diagram for describing projection of an image on a curved screen by an image display apparatus according to a comparative example.

FIG. 15 is a schematic diagram for describing projection of an image on a curved screen by an image display apparatus according to a comparative example.

An image display apparatus 90 is a projector that supports an ultra-wide angle. The image display apparatus 90 is different from the image display apparatus 20 according to the above-described embodiment of the present disclosure in the configuration of the concave reflective surface that reflects image light to the curved screen. Specifically, a concave reflective surface according to the comparative example reflects all the light beams included in image light toward directions that intersect with an optical axis at angles of 80 degrees or more. The optical axis serves as a criterion for configuring a projection optical system.

It is assumed that such an image display apparatus 90 projects an image of a maximum size onto the curved screen S. For example, as illustrated in FIG. 15A, it is assumed that an image 92 is projected onto the curved screen S in a way similar to the case of projecting the image 91 onto a plane screen S'. In other words, it is assumed that the same image light is projected onto the plane screen S' and the curved screen S.

Accordingly, a shape of the image 91 displayed on the plane screen S' is naturally different from a shape of an image 92 displayed on the curved screen S. In comparison with the image 91 displayed on the plane screen S', the image 92 displayed on the curved screen S is distorted drastically.

Therefore, it is necessary to perform electronic correction processing on an image signal to appropriately display the image 92 on the curved screen S. An amount of the correction depends on the shape of the curved screen S. In many cases, a huge amount of correction is necessary. This results in reduction in quality of the image 92.

In addition, as illustrated in FIG. 12B, it is necessary to install the image display apparatus 90 at a position away from the curved screen S to display the image 92 on a wide range of the curved screen S. As a result, the image display apparatus 90 becomes an eyesore to a user who is watching the image 92, and this deteriorates a sense of immersion into the content. In addition, this also increases a region where the shadow of the user appears, and this shrinks the region that allows the user to move. As a result, it is difficult to provide an excellent visual environment.

The image display system 100 according to the present embodiment is designed in such a manner that the concave reflective surface Mr3 has a wide reflective range of an angle of 80 degrees or more to the optical axis O serving as the criterion. As a result, it is possible to suppress distortion in the image that is optically displayed on the screen S. This makes it possible to sufficiently suppress an amount of electric correction for the image signal. As a result, it is possible to display the image with high quality.

In addition, as exemplified in FIG. 3, it is possible to project an image in a wide range of the curved screen S from a position close to the curved screen S. Therefore, it is possible to sufficiently prevent the user 3 from feeling deterioration in the sense of immersion into the content due to existence of the first image display apparatus 20*a* and the second image display apparatus 20*b*. In addition, it is possible to shrink the region where the shadow of the user 3 appears. This makes it possible to widen the region that allows the user 3 to move. As a result, it is possible to provide an excellent visual environment.

Note that, it is also possible to easily achieve the image display apparatus according to the present technology by replacing the concave reflective surface of the image display apparatus 90 according to the comparative example with the concave reflective surface according to the present technology and optimizing the entire configuration of the first optical system.

Second Embodiment

Next, an image display system according to a second embodiment of the present technology will be described. Hereinafter, description will be omitted or simplified with regard to structural elements and effects that are similar to the image display system 100 and the image display apparatus 20 described in the above embodiment.

Figure 16:
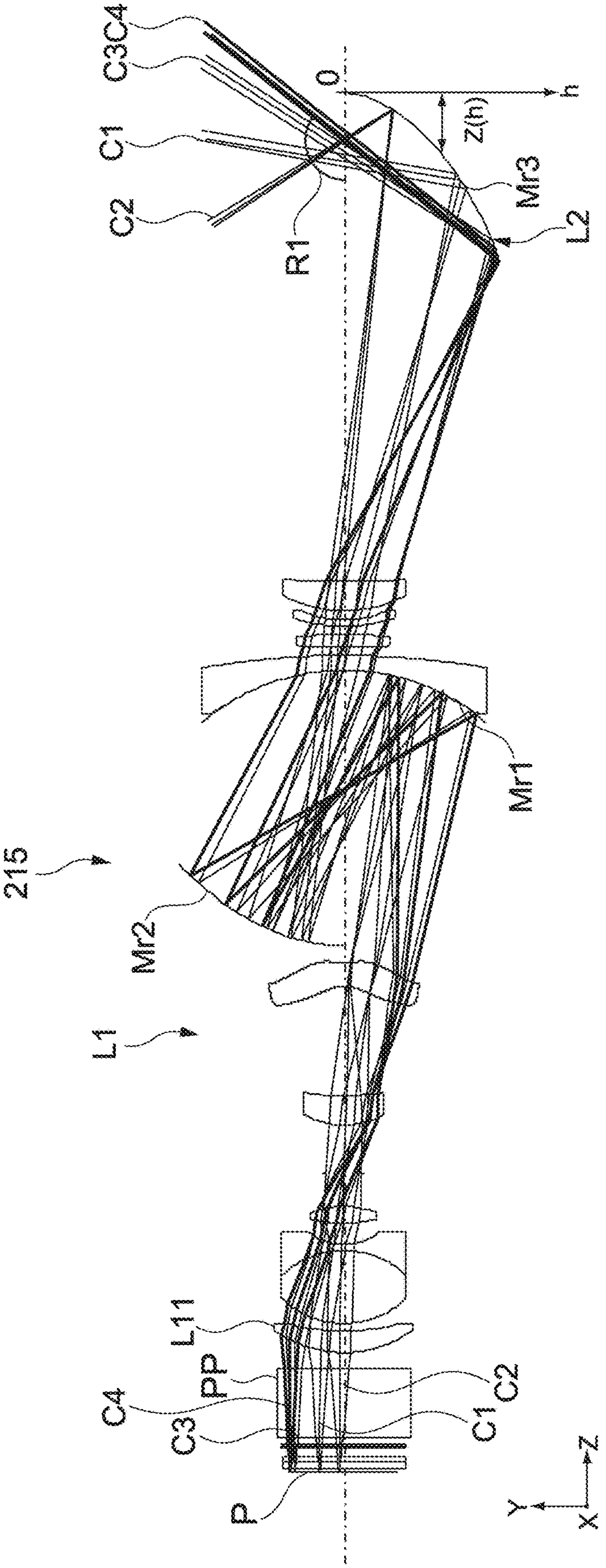
FIG. 16 is an optical path diagram illustrating a schematic configuration example of a projection optical system according to a second embodiment.
Figure 17:
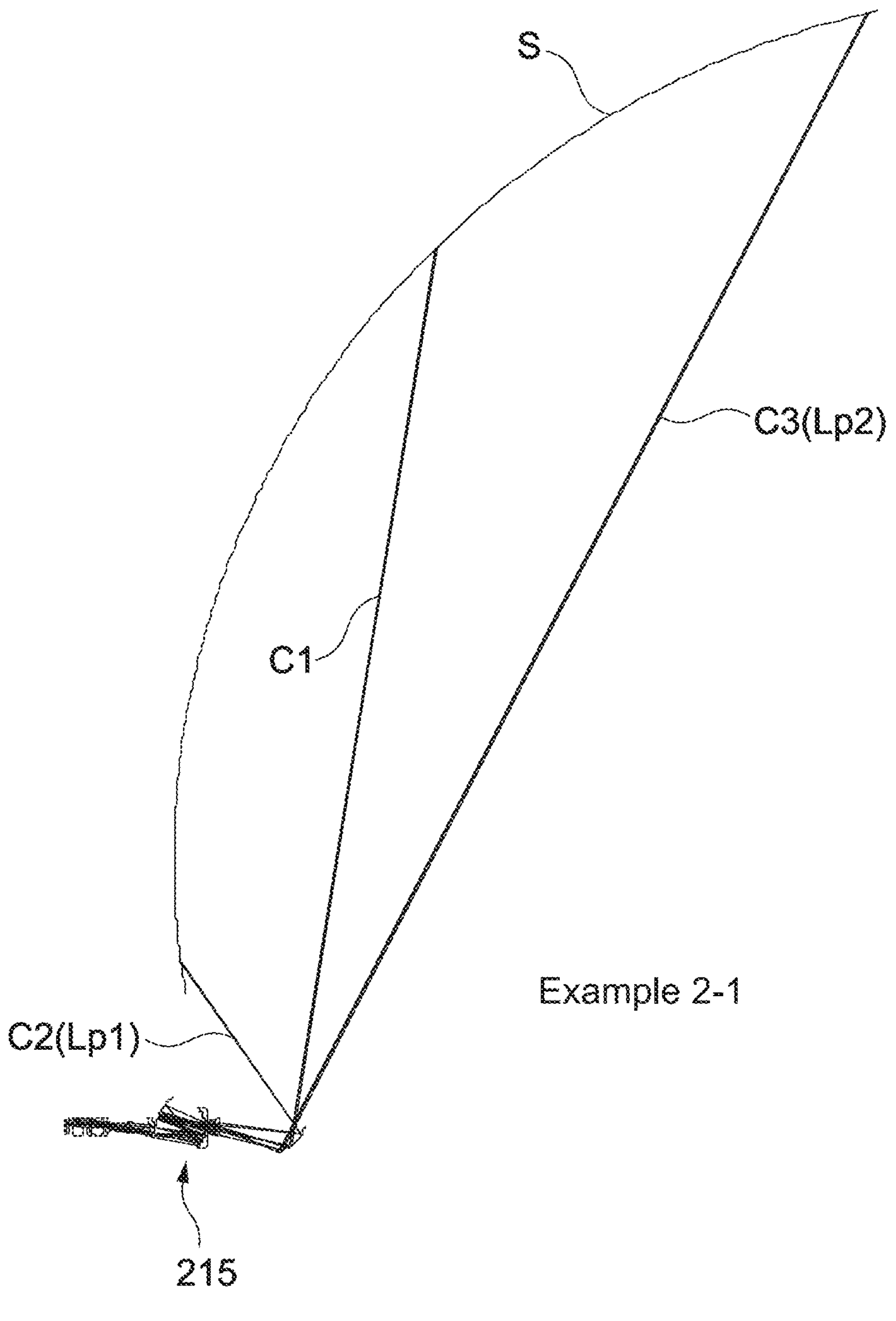
FIG. 17 is an optical path diagram illustrating a schematic configuration example of the projection optical system according to the second embodiment.
Figures 18, 19:
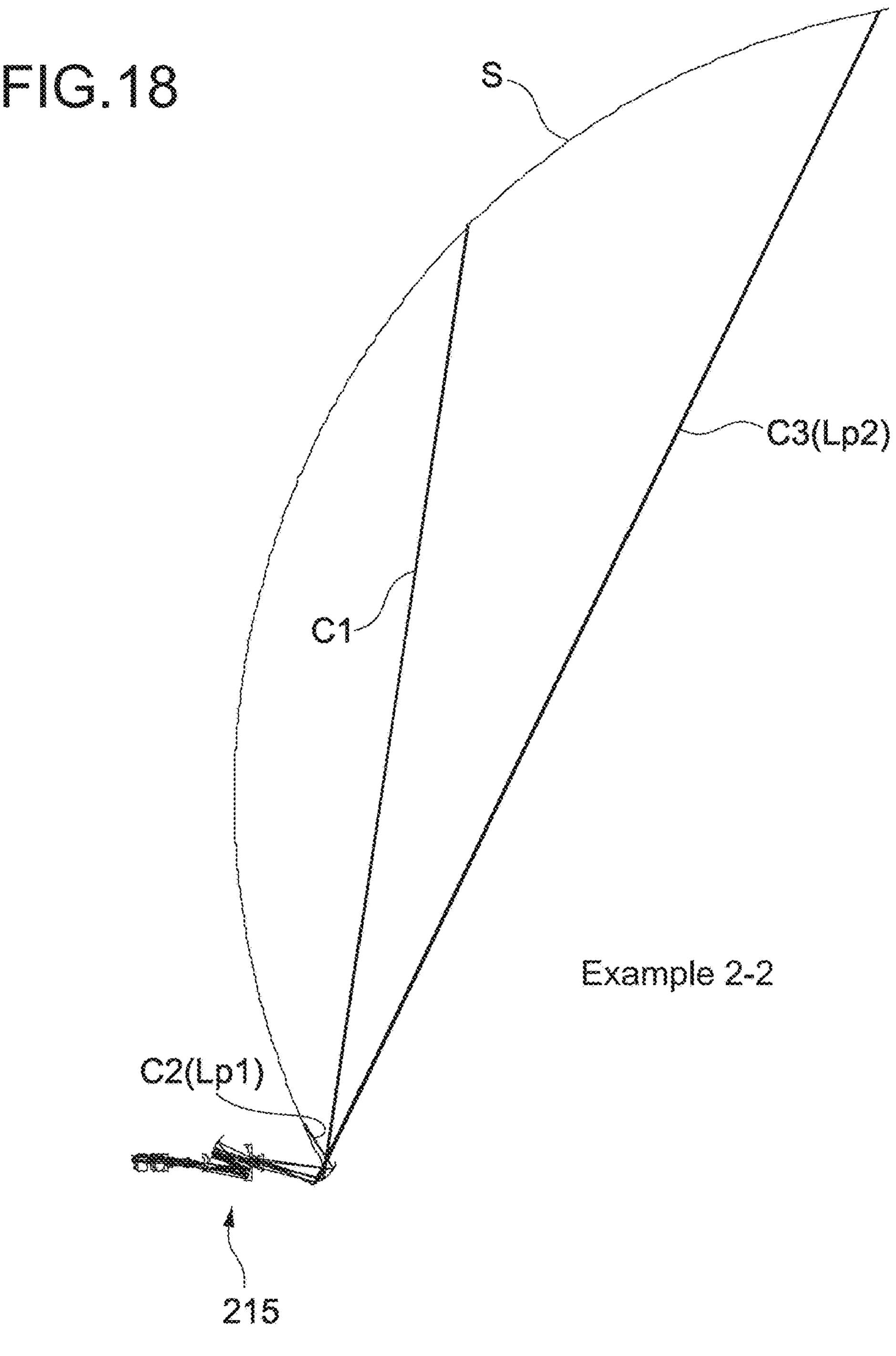
FIG. 18 is an optical path diagram illustrating a schematic configuration example of a projection optical system according to the second embodiment.
FIG. 19 is a table illustrating an example of parameters relating to image projection.

FIG. 16 to FIG. 18 are optical path diagrams illustrating a schematic configuration example of a projection optical system 215 according to the present embodiment. Note that, the configuration of a curved screen S illustrated in FIG. 17 is different from the configuration of a curved screen S illustrated in FIG. 18. Hereinafter, sometimes the configuration example illustrated in FIG. 17 will be referred to as Example 2-1, and the configuration example illustrated in FIG. 18 will be referred to as Example 2-2.

As illustrated in FIG. 16 to FIG. 18, the concave reflective surface Mr3 reflects at least one or more light beams included in the image light incident on the concave reflective surface Mr3, toward directions that intersect with a direction along the optical axis O serving as the reference axis at angles of 80 degrees or more.

In the example illustrated in FIG. 16, the pixel light beam C4 included in the image light is reflected toward a direction that intersects with the direction along the optical axis O at an angle of 80 degrees or more. The angle R1 of the intersection between the direction along the optical axis O and the propagation direction of the pixel light beam C4 reflected by the concave reflective surface Mr3 is 128.2 degrees. In addition, the angle R1 is the maximum angle of intersection, and it is understood that the angle R1 satisfies the conditional expression (1).

In the present embodiment, the pixel light beam C3 is also reflected to a direction that intersects with the direction along the optical axis O at an angle of 80 degrees or more. The angle of intersection of the pixel light beam C3 is 122.5 degrees.

FIG. 19 is a table illustrating an example of parameters relating to image projection.

FIG. 20 illustrates lens data of the image display apparatus and data of the curved screen.

FIG. 21 is a table illustrating an example of aspheric coefficients of optical components included in the projection optical system. In addition, FIG. 21 also illustrates decentering components in the X, Y, and Z directions and rotational components about the respective X, Y, and Z axes with regard to a curved screen according to Example 2-1 and a curved screen according to Example 2-2.

FIG. 22 is a table illustrating the Z(h) and the Z'(h) corresponding to a height h of a light beam.

Figure 23:
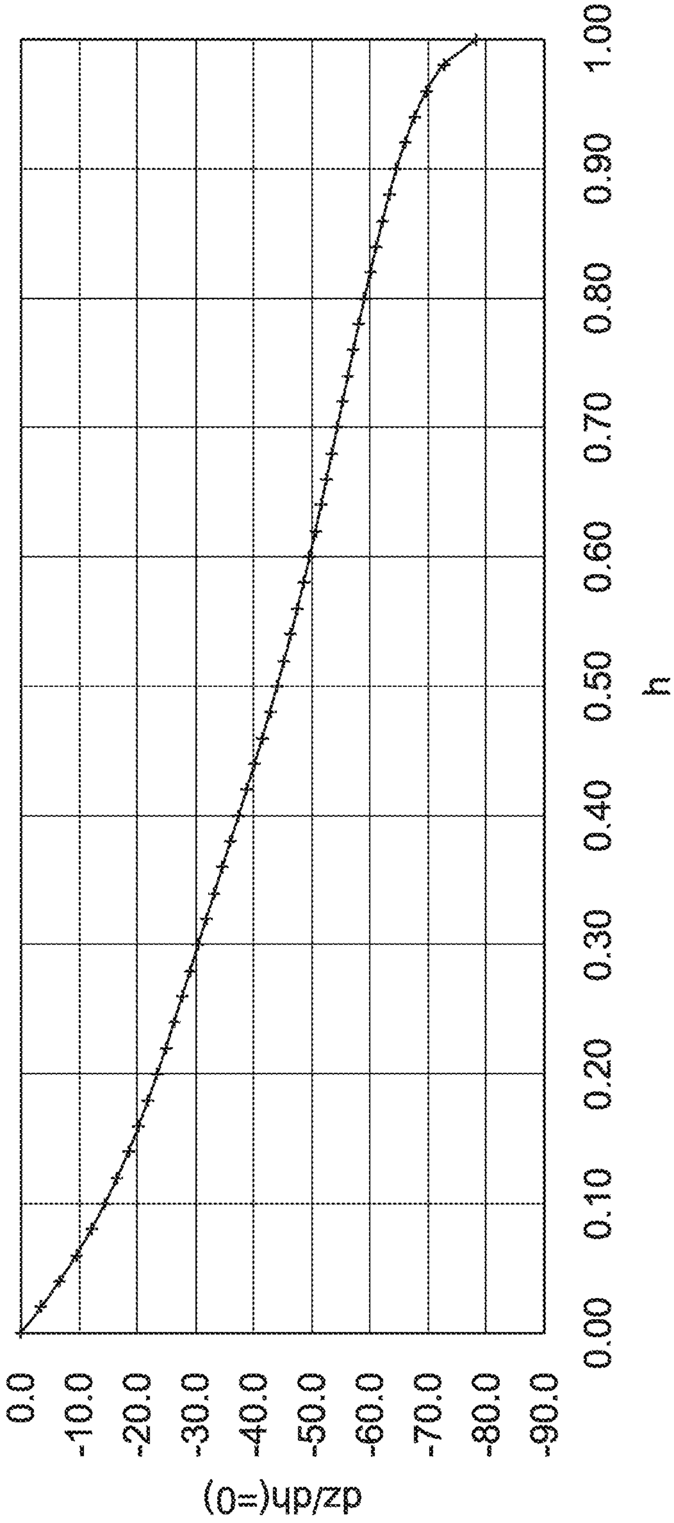
FIG. 23 is a graph illustrating a relationship between the height h of the light beam and "thita".

FIG. 23 is a graph illustrating a relationship between the height h of the light beam and "thita".

Figure 24:
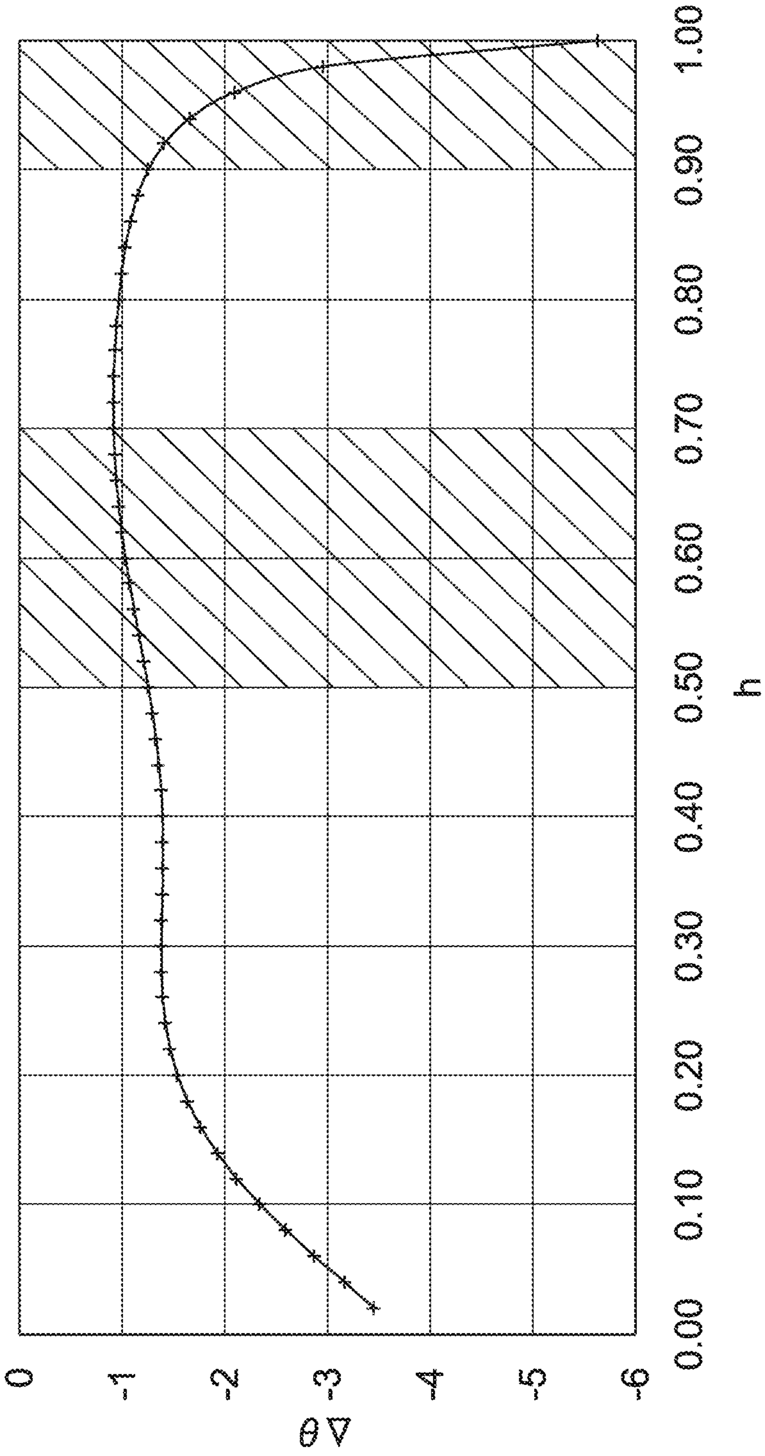
FIG. 24 is a graph illustrating a relationship between the height h of the light beam and "Δθ".

FIG. 24 is a graph illustrating a relationship between the height h of the light beam and "Δθ".

FIG. 25 is a table illustrating values of parameters used in conditional expressions (2) to (4) listed above according to the present embodiment.

$|Z'(1.0\cdot h\ \max)-Z'(0.9\cdot h\ \max)|$ 13.7

$|Z'ave.|$ 7.8

$|Z'(1.0\cdot h\ \max)-Z'(0.9\cdot h\ \max)|/|Z'ave.|$ 1.75

Example 2-1

Length of optical path of C1 933.01 mm
Length of optical path of C2 (=Lp1=Ln) 418.12 mm
Length of optical path of C3 (=Lp2) 1195.5 mm
Length of optical path of C4 (=Lf) 1277.93 mm
Lp1/Lp2 0.35
Ln/Lf 0.33

Example 2-2

Length of optical path of C1 1045.3 mm
Length of optical path of C2 (=Lp1=Ln) 306.5 mm
Length of optical path of C3 (=Lp2) 1319.84 mm
Length of optical path of C4 (=Lf) 1329.16 mm
Lp1/Lp2 0.23
Ln/Lf 0.23

The results described above are obtained, and it is understood that the conditional expressions (1) to (4) are satisfied. Note that, in Example 2-1 and Example 2-2, the length of the optical path of the pixel light beam C4 is Lf.

In the case of the configuration according to the present embodiment, it is possible to display a high-quality image that conforms to the curved screen S in a way similar to the above-described embodiment.

Other Embodiments

The present technology is not limited to the above-described embodiments. Various other embodiments are possible.

With reference to the graphs illustrated in FIG. 13 and FIG. 24, it is understood that large curvatures are obtained with regard to the light beam having the height of 0.9 to 1.00 in the case of the concave reflective surfaces Mr3 according to the first and second embodiments. In view of this, one of characteristics of the concave reflective surfaces Mr3 according to the present technology may be defined by the following conditional expressions.

In other words, the projection optical system is configured to satisfy the following relationships:

$$1<|Z'(1.0\cdot h\ \max)-Z'(0.9\cdot h\ \max)|/|Z'(0.7\cdot h\ \max)-Z'(0.5\cdot h\ \max)|<20;\ \text{and}$$

$$1<|Z'(1.0\cdot h\ \max)-Z'(0.9\cdot h\ \max)|/|Z'(0.5\cdot h\ \max)-Z'(0.3\cdot h\ \max)|<20.$$

These conditional expressions are obtained on the basis of a characteristic of larger shape variation of a light beams having a height of 0.9 to 1.00 than a height range of other light beams. The projection optical system according to the present technology may be configured by using such conditional expressions.

Figure 26:
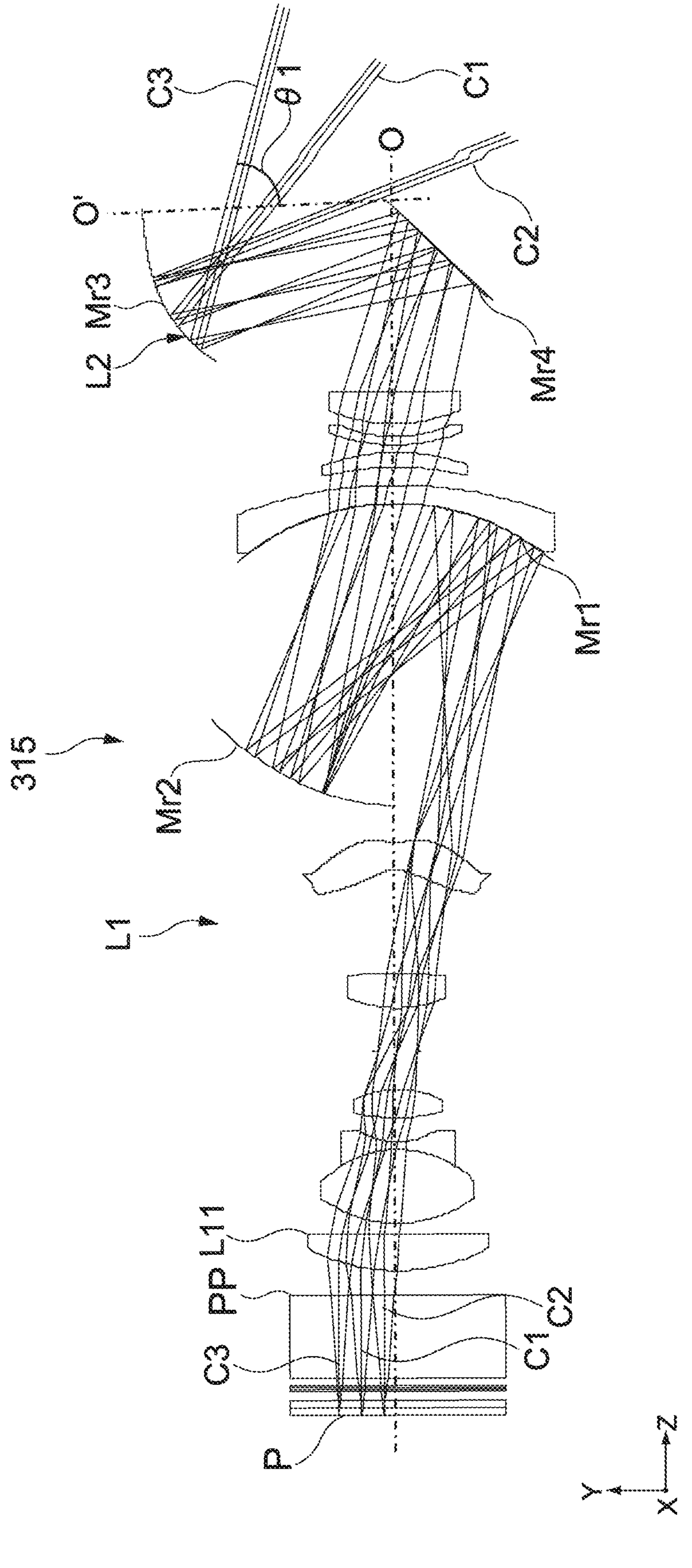
FIG. 26 is an optical path diagram illustrating a schematic configuration example of a projection optical system according to another embodiment.

FIG. 26 is an optical path diagram illustrating a schematic configuration example of a projection optical system according to another embodiment. A projection optical system 315 includes a plane reflective surface Mr4 disposed between the first optical system L1 and the concave reflective surface Mr3 serving as the second optical system L2. The plane reflective surface Mr4 bends propagation directions of optical paths of the first optical system L1. It is also possible to adopt the above-described configuration.

In such a case, it is sufficient to appropriately configure the concave reflective surface Mr3 by using a bent optical axis O' as a reference axis. That is, the concave reflective surface Mr3 is configured to reflect at least one or more light beams included in image light incident on the concave reflective surface Mr3, toward directions that intersect with a direction along the optical axis O' serving as the reference axis at angles of 80 degrees or more. In other words, the concave reflective surface Mr3 is configured in such a manner that an angle θ1 of intersection illustrated in FIG. 26 is 80 degrees or more with regard to some light beams. Note that, in FIG. 26, the concave reflective surface Mr3 is configured in such a manner that an angle θ1 of intersection of the pixel light beam C4 (not illustrated) is 80 degrees or more.

Figure 27:
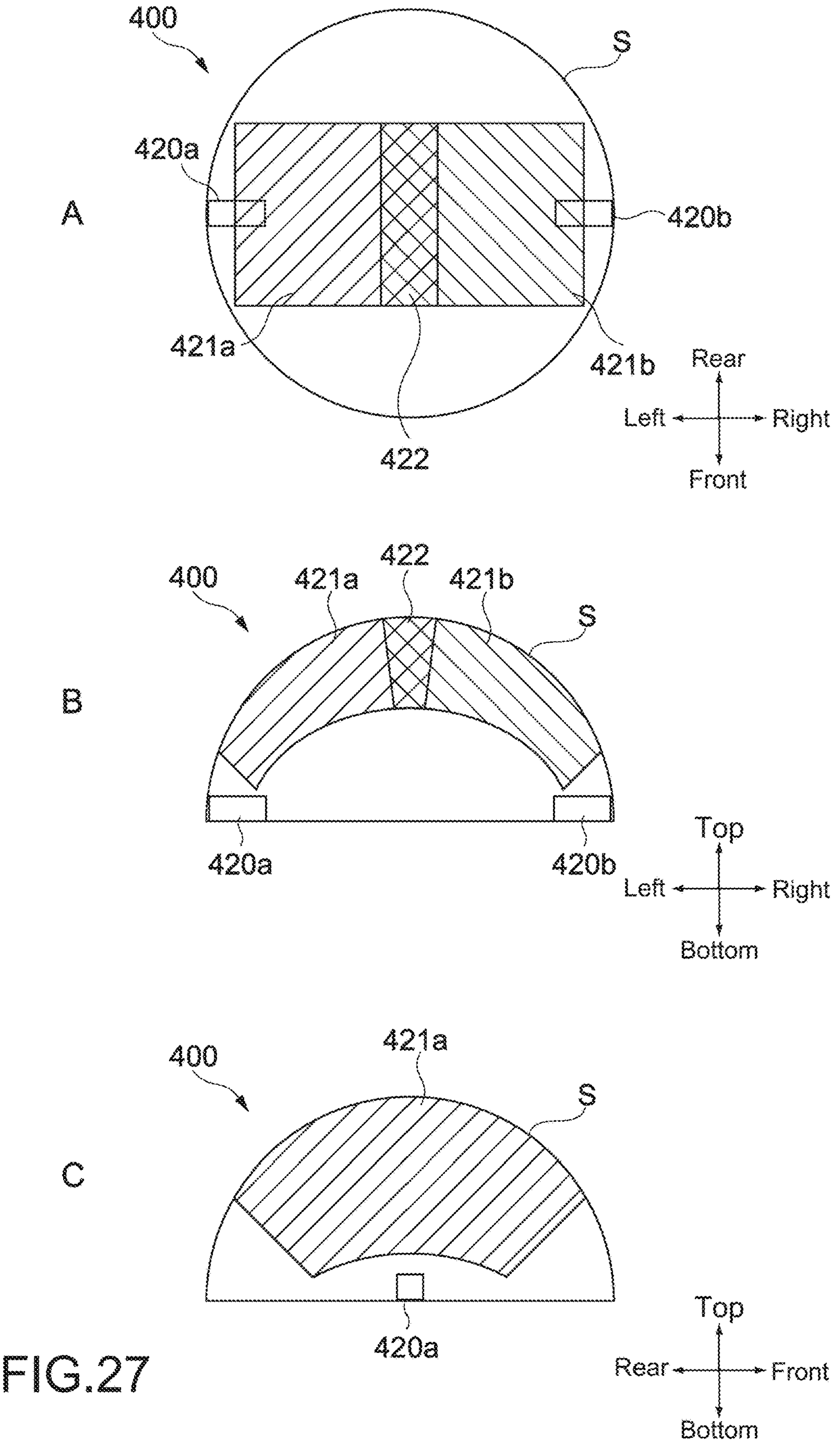
FIG. 27 is a schematic diagram illustrating a configuration example of an image display system according to another embodiment.
Figure 28:
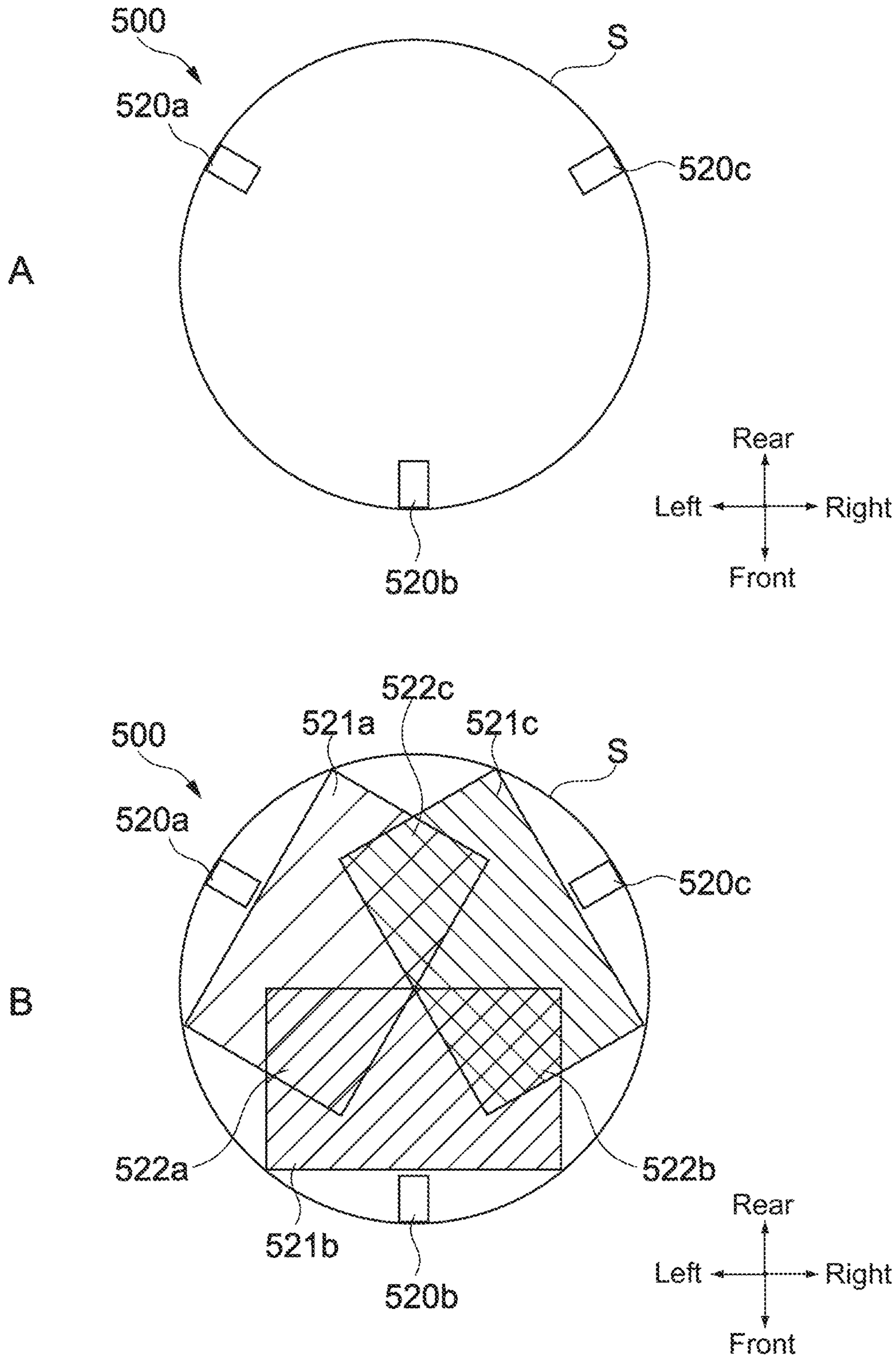
FIG. 28 is a schematic diagram illustrating a configuration example of an image display system according to another embodiment.

FIG. 27 and FIG. 28 are schematic diagrams illustrating configuration examples of an image display system according to other embodiments. An image display system 400 illustrated in FIG. 27 uses a curved screen S having a dome shape. Note that, the dome shape is not limited to a hemispheric shape. The dome shape may be any shape as long as it is possible to cover a space above an image display apparatus in 360 degrees.

As illustrated in FIG. 27A to FIG. 27C, a first image display apparatus 420*a* and a second image display apparatus 420 are installed below the curved screen S having the dome shape in such a manner that the first image display apparatus 420*a* and the second image display apparatus 420*b* face each other along the left-right direction. The first image display apparatus 420*a* and the second image display apparatus 420*b* are installed in such a manner that the first image display apparatus 420*a* and the second image display apparatus 420*b* are respectively capable of projecting a first image 421*a* and a second image 421*b* upward.

The first image 421*a* and the second image 421*b* are projected in such a manner that the first image 421*a* and the second image 421*b* overlap each other along the long-side direction (left-right direction). This makes it possible to generate an overlap region 422 at an apex of the curved screen S. In the overlap region 422, the first image 421*a* and the second image 421*b* overlap each other. The stitching processing is performed on the basis of the overlap region 422 to display a single image of large size.

By using the above-described image display apparatuses according to the present technology as the first image display apparatus 420*a* and the second image display apparatus 420*b*, it is possible to display a high-quality image that conforms to the dome shape, and it is possible to provide an excellent visual environment.

An image display system 500 illustrated in FIG. 28 includes a first image display apparatus 520*a*, a second image display apparatus 520*b*, and a third image display apparatus 520*b* below a curved screen S having a dome shape. These image display apparatuses are disposed at regular intervals along a circumference of the curved screen S. The first image display apparatus 520*a*, the second image display apparatus 520*b*, and the third image display apparatus 520*c* are installed in such a manner that the first image display apparatus 520*a*, the second image display apparatus 520*b*, and the third image display apparatus 520*c* are respectively capable of projecting a first image 521*a*, a second image 521*b*, and a third image 521*c* upward.

As illustrated in FIG. 28B, image light is projected to configure rectangular images as the first image 521*a*, the second image 521*b*, and the third image 521*c*. FIG. 18B schematically illustrates the first image 521*a*, the second image 521*b*, and the third image 521*c*, each of which has a rectangular shape. However, shapes displayed on the curved screen S are different from the rectangular shape.

The first image 521*a*, the second image 521*b*, and the third image 521*b* are projected on positions that are symmetrical to each other about the apex of the curved screen S in such a manner that the images overlap each other. In addition, the stitching processing is performed on overlap regions 522*a*, 522*b*, and 522*c* to display a single image of large size.

By using the above-described image display apparatuses according to the present technology as the first image display apparatus 520*a*, the second image display apparatus 520*b*, and the third image display apparatus 520*c*, it is possible to display a high-quality image that conforms to the dome shape, and it is possible to provide an excellent visual environment. As described above, the present technology is also applicable to the case of using three or more image display apparatuses.

It is also possible to use a freeform surface that has no axis of rotational symmetry, as the concave reflective surface that reflects image light to a screen. In this case, for example, the optical axis of the concave reflective surface (such as an axis that passes through a center of an optical surface) is aligned with a reference axis serving as a criterion for configuring a lens system. In addition, the concave reflective surface is appropriately designed to reflect at least one or more light beams included in image light, toward directions that intersect with a direction along the reference axis at angles of 80 degrees or more. This makes it possible to achieve effects that are similar to the above-described effects.

The projection target is not limited to the curved screen. The present technology is applicable to display of an image on any projection target such as a table or a wall of a building. In particular, it is possible to display a high-quality image that conforms to a projection target having a curved shape.

The respective configurations of the image display systems, the image display apparatuses, the projection optical systems, the concave reflective surfaces, the screens, and the like described with reference to the drawings are mere embodiments. Any modification can be made without departing from the gist of the present technology. In other words, it is possible to adopt any other configuration, algorithm, or the like to achieve the present technology.

In the present disclosure, the terms "coincide", "same", "perpendicular", "rectangular", "dome shape", "symmetric", and the like are used as concepts that include meanings of "substantially coincide", "substantially the same", "approximately perpendicular", "approximate rectangular", "approximate dome-like shape", "approximately symmetric", and the like. For example, they include states varied within a predetermined range (such as within a range of +10%) from criterial state such as "perfectly coincide", "perfectly the same", "perfectly perpendicular", "perfect rectangular", "perfect dome shape", "perfectly symmetric", and the like.

Out of the feature parts according to the present technology described above, at least two feature parts can be combined. That is, the various feature parts described in the embodiments may be arbitrarily combined irrespective of the embodiments. Further, the various effects described above are merely examples and are not limited, and other effects may be exerted.

Note that, the present technology may also be configured as below.

(1) An image display apparatus, including:

a light source;

an image generator that modulates light emitted from the light source and generates image light; and a projection optical system including a lens system that is configured on the basis of a reference axis at a position on which the generated image light is incident, and that has a positive refracting power as a whole, and a concave reflective surface that is configured on the basis of the reference axis, and that reflects the image light emitted from the lens system toward a projection target, in which the concave reflective surface reflects at least one or more light beams included in the image light incident on the concave reflective surface, toward a direction that intersects with a direction along the reference axis at an angle of 80 degrees or more.

(2) The image display apparatus according to (1), in which the image light includes a plurality of pixel light beams, and the concave reflective surface reflects at least one of the plurality of pixel light beams toward the direction that intersects with the direction along the reference axis at the angle of 80 degrees or more.

(3) The image display apparatus according to (1) or (2), in which the image display apparatus is configured to satisfy a relationship:

$$80\ \text{degrees} \leq \theta 1\ \text{max} \leq 160\ \text{degrees},$$

where θ1 represents an angle of intersection between the direction along the reference axis and propagation directions of respective light beams included in the image light reflected by the concave reflective surface, and θ1 max represents an angle θ1 of a light beam having a maximum angle θ1.

(4) The image display apparatus according to any one of (1) to (3), in which the concave reflective surface is configured to have an axis of rotational symmetry that coincides with the reference axis, and the image display apparatus is configured to satisfy a relationship:

$$1 < |Z'(1.0 \cdot h\ \text{max}) - Z'(0.9 \cdot h\ \text{max})| / |Z'ave.| < 20,$$

where h represents a height of the light beam above the reference axis, Z'(h) represents a derivative function obtained by differentiating a function Z(h) with respect to the height of the light beam, the function Z(h) represents a shape of the concave reflective surface corresponding to the height of the light beam, hmax represents a height of a light beam corresponding to a reflection point situated farthest from the reference axis for reflecting the image light, and Z'ave. represents an average value of the Z'(h) from the reference axis to the height hmax of the light beam.

(5) The image display apparatus according to any one of (1) to (4), in which the reference axis is an axis obtained by extending an optical axis of a lens that is included in the lens system and that is situated closest to the image generator.

(6) The image display apparatus according to any one of (1) to (5), in which the lens system is configured to include one or more optical components having respective optical axes that coincide with the reference axis.

(7) The image display apparatus according to any one of (1) to (6), in which the concave reflective surface is configured to have an optical axis that coincides with the reference axis.

(8) The image display apparatus according to any one of (1) to (3) and (5) to (7), in which the concave reflective surface is a freeform surface that has no axis of rotational symmetry.

(9) A projection optical system that projects image light generated by modulating light emitted from a light source, the projection optical system including:

a lens system that is configured on the basis of a reference axis at a position on which the generated image light is incident, and that has a positive refracting power as a whole; and a concave reflective surface that is configured on the basis of the reference axis, and that reflects the image light emitted from the lens system toward a projection target, in which the concave reflective surface reflects at least one or more light beams included in the image light incident on the concave reflective surface, toward a direction that intersects with a direction along the reference axis at an angle of 80 degrees or more.

(10) An image display system, including:

(A) a projection target; and (B) one or more image display apparatus, each of which includes a light source, an image generator that modulates light emitted from the light source and generates image light, and a projection optical system including a lens system that is configured on the basis of a reference axis at a position on which the generated image light is incident, and that has a positive refracting power as a whole, and a concave reflective surface that is configured on the basis of the reference axis, and that reflects the image light emitted from the lens system toward the projection target, in which the concave reflective surface reflects at least one or more light beams included in the image light incident on the concave reflective surface, toward a direction that intersects with a direction along the reference axis at an angle of 80 degrees or more.

(11) The image display system according to (10), in which the image generator includes an image modulation element that emits the image light, the image modulation element includes a plurality of pixels, each of which emits a pixel light beam, the image modulation element emits the image light including a plurality of the pixel light beams emitted from the plurality of pixels, and the image display system is configured to satisfy a relationship:

$$0.005 < Lp1/Lp2 < 0.5,$$

where Lp1 represents a length of an optical path of a pixel light beam emitted to the projection target from a pixel that is situated closest to the reference axis in the image modulation element, and Lp2 represents a length of an optical path of a pixel light beam emitted to the projection target from a pixel that is situated farthest from the reference axis and that is positioned on a straight line connecting the pixel situated closest to the reference axis with a central pixel in the image modulation element.

(12) The image display system according to (10) or (11), in which the image display system is configured to satisfy a relationship:

$$0.005 < Ln/Lf < 0.5,$$

where Ln represents a length of an optical path of a shortest light beam to the projection target, and Lf represents a length of an optical path of a longest light beam among the light beams included in the image light.

(13) The image display system according to any one of (10) to (12), in which the projection target is a curved screen, and the one or more image display apparatuses are installed in such a manner that the respective concave reflective surfaces are disposed at positions corresponding to a shape of the curved screen.

(14) The image display system according to any one of (19) to (13), in which the one or more image display apparatuses include a first image display apparatus that projects a first image on the curved screen and a second image display apparatus that projects a second image on the curved screen, and the first image display apparatus and the second image display apparatus respectively project the first image and the second image in such a manner that the first image and the second image overlap each other.

(15) The image display system according to (14), in which the first image display apparatus and the second image display apparatus respectively project the first image and the second image in such a manner that beams of image light that constitute a region other than a region where the first image and the second image overlap each other do not intersect with each other.

(16) The image display system according to (14) or (15), in which the image generator generates the image light that constitutes a rectangular image, and the first image display apparatus and the second image display apparatus respectively project the first image and the second image in such a manner that the first image and the second image overlap each other along a long-side direction of the first image and the second image.

(17) The image display system according to (14) or (15), in which the image generator generates the image light that constitutes a rectangular image, and the first image display apparatus and the second image display apparatus respectively project the first image and the second image in such a manner that the first image and the second image overlap each other along a short-side direction of the first image and the second image.

(18) The image display system according to any one of (10) to (17), in which the projection target is a screen having a dome shape.

(19) The image display system according to any one of (10) to (18), in which the one or more image display apparatus include three or more image display apparatuses.

REFERENCE SIGNS LIST

C1 to C4 pixel light beam
L1 first optical system
L2 second optical system
Mr3 concave reflective surface
1 liquid crystal projector
5 light source
10 illumination optical system
15, 215, 315 projection optical system
20
20*a*, 420*a*, 520*a* first image display apparatus
20*b*, 420*b*, 520*b* second image display apparatus
21*a*, 421*a*, 521*a* first image
21*b*, 421*b*, 521*b* second image
22, 422, 522*a* to *c* overlap region
23*a* first image light
23*b* second image light
30, S curved screen
100, 400, 500 image display system
520*c* third image display apparatus
521*c* third image display apparatus

The invention claimed is:

1. An image display apparatus, comprising:

a light source;

an image generator that modulates light emitted from the light source and generates image light; and a projection optical system including a lens system that is configured on a basis of a reference axis at a position on which the generated image light is incident, and that has a positive refracting power as a whole, and a concave reflective surface that is configured on a basis of the reference axis, and that reflects the image light emitted from the lens system toward a projection target, wherein the concave reflective surface reflects at least one or more light beams included in the image light incident on the concave reflective surface, toward a direction that intersects with a direction along the reference axis at an angle of 80 degrees or more.

2. The image display apparatus according to claim 1, wherein the image light includes a plurality of pixel light beams, and the concave reflective surface reflects at least one of the plurality of pixel light beams toward the direction that intersects with the direction along the reference axis at the angle of 80 degrees or more.

3. The image display apparatus according to claim 1, wherein the image display apparatus is configured to satisfy a relationship:

$$80\text{ degrees}\leq\theta 1\text{ max}\leq 160\text{ degrees},$$

where θ1 represents an angle of intersection between the direction along the reference axis and propagation directions of respective light beams included in the image light reflected by the concave reflective surface, and θ1 max represents an angle θ1 of a light beam having a maximum angle θ1.

4. The image display apparatus according to claim 1, wherein the concave reflective surface is configured to have an axis of rotational symmetry that coincides with the reference axis, and the image display apparatus is configured to satisfy a relationship:

$$1<|Z'(1.0\cdot h\text{ max})-Z'(0.9\cdot h\text{ max})|/|Z'ave.|<20,$$

where h represents a height of the light beam above the reference axis, Z'(h) represents a derivative function obtained by differentiating a function Z(h) with respect to the height of the light beam, the function Z(h) represents a shape of the concave reflective surface corresponding to the height of the light beam, hmax represents a height of a light beam corresponding to a reflection point situated farthest from the reference axis for reflecting the image light, and Z'ave. represents an average value of the Z'(h) from the reference axis to the height hmax of the light beam.

5. The image display apparatus according to claim 1, wherein the reference axis is an axis obtained by extending an optical axis of a lens that is included in the lens system and that is situated closest to the image generator.

6. The image display apparatus according to claim 1, wherein the lens system is configured to include one or more optical components having respective optical axes that coincide with the reference axis.

7. The image display apparatus according to claim 1, wherein the concave reflective surface is configured to have an optical axis that coincides with the reference axis.

8. The image display apparatus according to claim 1, wherein the concave reflective surface is a freeform surface that has no axis of rotational symmetry.

9. A projection optical system that projects image light generated by modulating light emitted from a light source, the projection optical system comprising:

a lens system that is configured on a basis of a reference axis at a position on which the generated image light is incident, and that has a positive refracting power as a whole; and a concave reflective surface that is configured on a basis of the reference axis, and that reflects the image light emitted from the lens system toward a projection target, wherein the concave reflective surface reflects at least one or more light beams included in the image light incident on the concave reflective surface, toward a direction that intersects with a direction along the reference axis at an angle of 80 degrees or more.

10. An image display system, comprising:

(A) a projection target; and (B) one or more image display apparatus, each of which includes a light source, an image generator that modulates light emitted from the light source and generates image light, and a projection optical system including a lens system that is configured on a basis of a reference axis at a position on which the generated image light is incident, and that has a positive refracting power as a whole, and a concave reflective surface that is configured on a basis of the reference axis, and that reflects the image light emitted from the lens system toward the projection target, wherein the concave reflective surface reflects at least one or more light beams included in the image light incident on the concave reflective surface, toward a direction that intersects with a direction along the reference axis at an angle of 80 degrees or more.

11. The image display system according to claim 10, wherein the image generator includes an image modulation element that emits the image light, the image modulation element includes a plurality of pixels, each of which emits a pixel light beam, the image modulation element emits the image light including a plurality of the pixel light beams emitted from the plurality of pixels, and the image display system is configured to satisfy a relationship:

$$0.005 < Lp1/Lp2 < 0.5,$$

where Lp1 represents a length of an optical path of a pixel light beam emitted to the projection target from a pixel that is situated closest to the reference axis in the image modulation element, and Lp2 represents a length of an optical path of a pixel light beam emitted to the projection target from a pixel that is situated farthest from the reference axis and that is positioned on a straight line connecting the pixel situated closest to the reference axis with a central pixel in the image modulation element.

12. The image display system according to claim 10, wherein the image display system is configured to satisfy a relationship:

$$0.005 < Ln/Lf < 0.5,$$

where Ln represents a length of an optical path of a shortest light beam to the projection target, and Lf represents a length of an optical path of a longest light beam among the light beams included in the image light.

13. The image display system according to claim 10, wherein the projection target is a curved screen, and the one or more image display apparatuses are installed in such a manner that the respective concave reflective surfaces are disposed at positions corresponding to a shape of the curved screen.

14. The image display system according to claim 10, wherein the one or more image display apparatuses include a first image display apparatus that projects a first image on the curved screen and a second image display apparatus that projects a second image on the curved screen, and the first image display apparatus and the second image display apparatus respectively project the first image and the second image in such a manner that the first image and the second image overlap each other.

15. The image display system according to claim 14, wherein the first image display apparatus and the second image display apparatus respectively project the first image and the second image in such a manner that beams of image light that constitute a region other than a region where the first image and the second image overlap each other do not intersect with each other.

16. The image display system according to claim 14, wherein the image generator generates the image light that constitutes a rectangular image, and the first image display apparatus and the second image display apparatus respectively project the first image and the second image in such a manner that the first image and the second image overlap each other along a long-side direction of the first image and the second image.

17. The image display system according to claim 14, wherein the image generator generates the image light that constitutes a rectangular image, and the first image display apparatus and the second image display apparatus respectively project the first image and the second image in such a manner that the first image and the second image overlap each other along a short-side direction of the first image and the second image.

18. The image display system according to claim 10, wherein the projection target is a screen having a dome shape.

19. The image display system according to claim 10, wherein the one or more image display apparatus include three or more image display apparatuses.

* * * * *